United States Patent
Ona

[19]

[11] Patent Number: 5,966,776
[45] Date of Patent: Oct. 19, 1999

[54] HINGE DEVICE

[75] Inventor: Masaaki Ona, Nagaoka, Japan

[73] Assignee: Strawberry Corporation, Saitama-ken, Japan

[21] Appl. No.: 09/072,464

[22] Filed: May 5, 1998

[30]     Foreign Application Priority Data

May 7, 1997  [JP]  Japan ................................... 9-117309
Jul. 28, 1997 [JP]  Japan ................................... 9-202005

[51] Int. Cl.[6] ................................ E05D 11/10; E05F 1/08
[52] U.S. Cl. ................................... 16/328; 16/303; 16/342
[58] Field of Search .............................. 16/342, 328, 329, 16/330, 331, 340, 303

[56]              References Cited

U.S. PATENT DOCUMENTS

| | | | |
|---|---|---|---|
| 4,186,905 | 2/1980 | Brudy .......................................... | 16/330 |
| 4,734,955 | 4/1988 | Connor ....................................... | 16/332 |
| 4,822,965 | 4/1989 | Hyogo et al. .............................. | 16/330 |
| 5,109,571 | 5/1992 | Ohshima et al. .......................... | 16/307 |
| 5,356,000 | 10/1994 | Scicluna ..................................... | 16/282 |
| 5,379,183 | 1/1995 | Okonsky et al. .......................... | 16/342 |
| 5,406,678 | 4/1995 | Rude et al. ................................ | 16/342 |
| 5,500,982 | 3/1996 | Hosoi ......................................... | 16/342 |
| 5,600,868 | 2/1997 | Tourville et al. .......................... | 16/277 |
| 5,613,275 | 3/1997 | Kolberg et al. ............................ | 16/342 |
| 5,678,206 | 10/1997 | Ishii ........................................... | 16/342 |
| 5,697,125 | 12/1997 | Gannon ..................................... | 16/342 |
| 5,715,576 | 2/1998 | Liu ............................................ | 16/342 |
| 5,799,371 | 9/1998 | Lin ............................................ | 16/342 |

*Primary Examiner*—Chuck Y. Mah
*Attorney, Agent, or Firm*—Scully, Scott, Murphy & Presser

[57]              ABSTRACT

A hinge device is disclosed for interconnecting a first member with a second member for relative rotational movement, the hinge device comprising: a rod means connected with the first member; a sleeve member for receiving the rod means for relative rotation therewithin, the sleeve member being connected with the second member and having an interior surface extending longitudinally therethrough, the interior surface being in contact with the outer surface of the shaft means in order to provide a friction force between the shaft means and the sleeve member, the interior surface including a plurality of contact regions for exerting different friction forces on the shaft means.

11 Claims, 21 Drawing Sheets

HINGE DEVICE

FIELD OF THE INVENTION

The present invention relates to a hinge device for hinged or pivotally interconnected members, and more particularly to such hinge devices adapted for cellular phones, electronic data-books, cosmetic compacts, and the like.

This application is based on Japanese Patent Applications Nos. Hei 9-117309 and Hei 9-202005, the contents of which are incorporated herein by reference.

BACKGROUND ART

Various types of compact devices such as cellular telephones, and electronic data-books equipped with liquid crystal displays and keyboard panels have been developed and put into general use with advances in electronics technology in recent years. These devices are principally composed of two members, which are pivotally interconnected so that they may be unfolded open to a specific size to make the device easy to operate when the device is in use. The two members may be folded closely to permit compact storage of the device, to avoid malfunction of keyboards, and to avoid damages to the liquid crystal displays when the device is carried in a bag or in a pocket.

For example, in a conventional cellular telephone, a main body having a keyboard and a transmitter having a microphone are pivotally interconnected. The transmitter may be closed for carrying convenience and to cover the keyboard (hereinafter, this position will be referred to as the "closed position"), and may be opened to allow operation via the keyboard when the telephone is in use (hereinafter, this position will be referred to as the "opened position"). A conventional electronic data-book also has a main body having a keyboard and a liquid crystal display pivotally interconnected with the main body. A conventional cosmetic compact also has a case for accommodating a puff and a mirror pivotally interconnected to the case.

Typical hinge devices adapted for these devices pivotally connect the main body and the cover in simple manners. When a user releases a lock mechanism between the main body and the cover, the cover is automatically rotated to the closed position by means of, for example, a spring. A user closes the cover against the biasing force by the spring, at which position the cover is locked with the main body by means of the lock mechanism.

The prior hinge device has a stopper for engaging the cover with the main body at the opened position, as well as the lock mechanisms for locking the cover with the main body at the closed position. The stopper is disposed adjacent to the pivot in order to reduce the size of the hinge device, and the cover or the stopper may be damaged because of excessive stress arising from the engagement between the cover and the stopper.

In addition to the above disadvantages, the prior hinge devices have not allowed adjustment of the cover with respect to the main body at any chosen angle. Although the prior hinge devices have performed quite well in the engagement of the cover at the opened and closed positions, an additional engaging means is required to hold the cover at any chosen angle. The need has therefore arisen for a hinge device which allows for a variety of selectively variable rotated positions in which, for example, a movable transmitter of a cellular telephone or a movable liquid crystal display of a electronic data-book can be held and maintained.

Furthermore, it has become increasingly desirable to provide a hinge device which has a biasing means for biasing the cover toward the closed position when it is slightly opened whereas biasing the cover in a direction of the opened position when it is close to the opened position. Particularly, it is desirable to provide a cellular telephone in which the cover is automatically moved to the closed position when a user slightly closes the cover after a call and in which the cover is automatically moved to the opened position when he opens the cover to use the telephone.

However, the prior hinge devices have not provided the above-mentioned function because biasing the cover in both directions of the opened and closed positions is impossible although biasing the cover in one rotational direction is possible.

Some devices employ friction hinge devices as a means capable of locking the cover at any chosen angle with respect to the main body. The prior friction hinge, however, cannot achieve the above-mentioned function because it provides a regular friction force against the cover throughout any angle.

SUMMARY OF THE INVENTION

It is therefore an object of the present invention to provide a hinge device for pivotally interconnected members, which can lock a movable member at opened and closed positions and can maintain the movable member at any chosen angle, thereby providing easy manipulability of a device using the hinge device.

In order to accomplish the above object, a hinge device for interconnecting a first member with a second member for relative rotational movement is provided, the hinge device comprising: a rod means connected with the first member; a sleeve member for receiving the rod means for relative rotation therewithin, the sleeve member being connected with the second member and having an interior surface extending longitudinally therethrough, the interior surface being in contact with the outer surface of the rod means in order to provide a friction force between the rod means and the sleeve member, the interior surface including a plurality of contact regions for exerting different friction forces to the shaft means.

The contact regions, which are included in a friction reduction means, reduces the friction force in a predetermined range of pivot angle, thereby increasing a force for holding the first member relative rotated to the second member at a variable positions while decreasing the holding force in a predetermined position. The rod means and the sleeve member makes the construction simpler while providing the above advantages.

The contact regions preferably extend in the direction of the axis of the rod means and are located in the circumferential direction of the interior surface of the sleeve member. The interior surface may include a pair of first contact regions facing each other and a pair of second contact regions facing each other, and the distance between the first contact regions may be preferably greater than the distance between the second contact regions, thus making the construction simpler. The maximum outside diameter of the rod means may be preferably greater than the minimum inside diameter of the sleeve member.

In another aspect of the present invention, a hinge device further comprises: a first cam fixed to the first member; a second cam fixed to the second member; a shaft means coaxially supporting the first cam and the second cam so that they can relatively rotate, the shaft means being disposed coaxially with the rod means; a biasing means for pressing the first cam and second cam to each other, wherein the first cam has a projection on one end thereof, the second cam having a concavity and a flat portion on one end thereof, the concavity being formed for receiving the projection of the first cam when the second cam is located in a predetermined range of pivot angle, and the flat portion being formed so as to stably support the projection when the second cam is located in a range other than the predetermined range of pivot angle.

The invention provides the force for holding the first member at the predetermined position while reducing the holding force at the other positions, in connection with the above friction reduction means. One of the first cam and second cam may be preferably movable in the direction of the rotational axis of the second cam. The concavity may preferably have an inclined surface for guiding the projection. One of the contact regions may preferably contact the outer surface of the rod means so as to reduce the friction force when the projection of the first cam is positioned on the inclined surface.

In another aspect of the present invention, a hinge device for interconnecting a first member with a second member for relative rotational movement, the hinge device comprising: a first cam fixed to the first member; a second cam fixed to the second member; a shaft means coaxially supporting the first cam and the second cam so that they can relatively rotate; a biasing means for pressing the first cam and second cam to each other, and a friction element attached to one of the first and second members, the friction element being in contact with the outer surface of the shaft means in order to exert a friction force on the shaft means, wherein the first cam has a projection on one end thereof, the second cam having a concavity and a flat portion on one end thereof, the concavity being formed for receiving the projection of the first cam when the second cam is located in a predetermined range of pivot angle, and the flat portion being formed so as to stably support the projection when the second cam is located in a range other than the predetermined range of pivot angle.

The hinge device eliminates a projection obstructive in design or in use on the first member and the second member, contributing greatly to design flexibility, because the rotated member is held without any lock mechanism. This provides a "free stop" function in which the first member, which is rotated relative to the second member, is held at any chosen position by the friction force.

The friction element may be a cylindrical plate spring sleeved tightly around the shaft means, making the construction simpler. The friction element, which is a plate spring, may be reduced in radial thickness, thus resulting in a compact hinge device which is suitable for a thin, portable device. The friction element of the plate spring may be integrally formed with the first or second member, thereby reducing the number of parts and the manufacturing costs.

The concavity preferably has an inclined surface for guiding the projection. This invention allows the first member to be automatically closed by the torque exerted by the biasing means biasing the projection toward the concavity along the inclined surface. This eliminates an operation to completely engage the projection with the concavity, facilitating the closing operation.

The shaft means may have a plurality of contact regions for contacting with the friction plate, the friction element having a gap for receiving at least one of the contact regions in order to reduce the friction force on the shaft means when the second cam is in a range other than the predetermined range of pivot angle. The first cam is smoothly rotated relative to the second cam, thus providing smooth rotation of the first member relative to the second member.

In another aspect of the present invention, the friction element includes a plurality of friction plates, the friction plates being arranged in layers perpendicularly to the shaft means, the friction plates having through holes through which the shaft means is inserted, the interior surfaces of the through holes being in contact with the outer surface of the shaft means. In addition to the above advantages, the number and the thickness of the friction plates can be changed in order to adjust the friction force if desired in a particular application. The hinge device thus provides the friction force necessary in a given application.

DETAILED DESCRIPTION OF THE PREFERRED EMBODIMENTS

First Embodiment

Referring to FIGS. 1 to 4, a first embodiment of a hinge device according to the present invention, will be explained. The hinge device is adapted for a cellular phone in the first embodiment.

Figure 1:
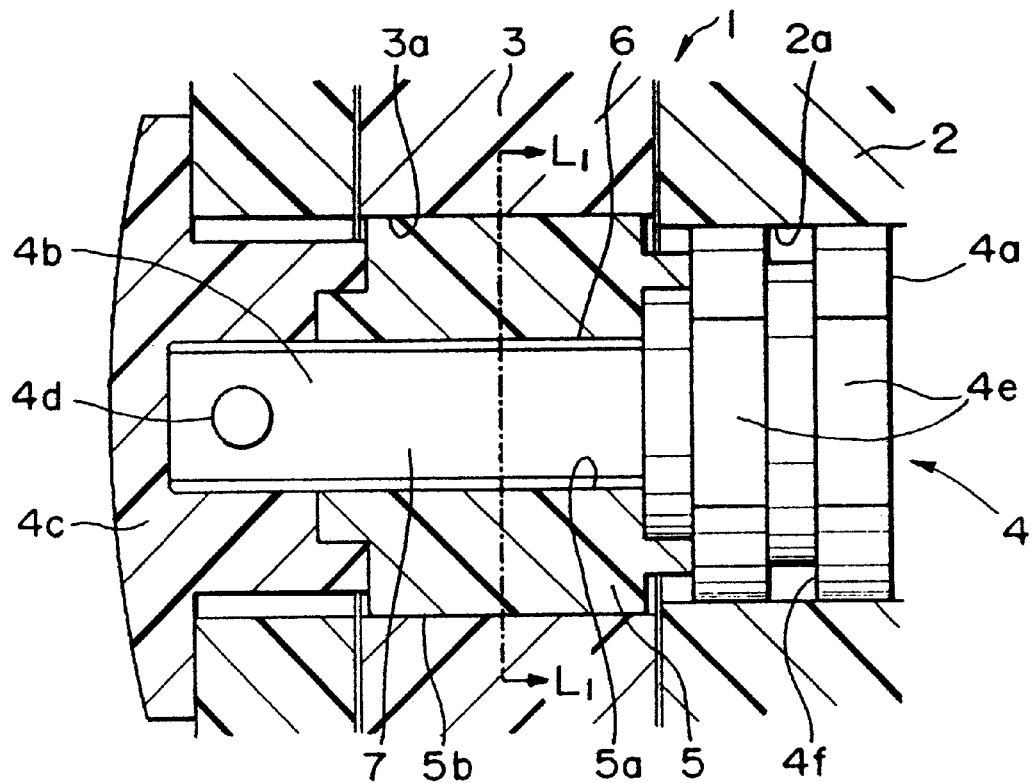
FIG. 1 is a cross section of a hinge device of a first embodiment according to the present invention.
Figure 3:
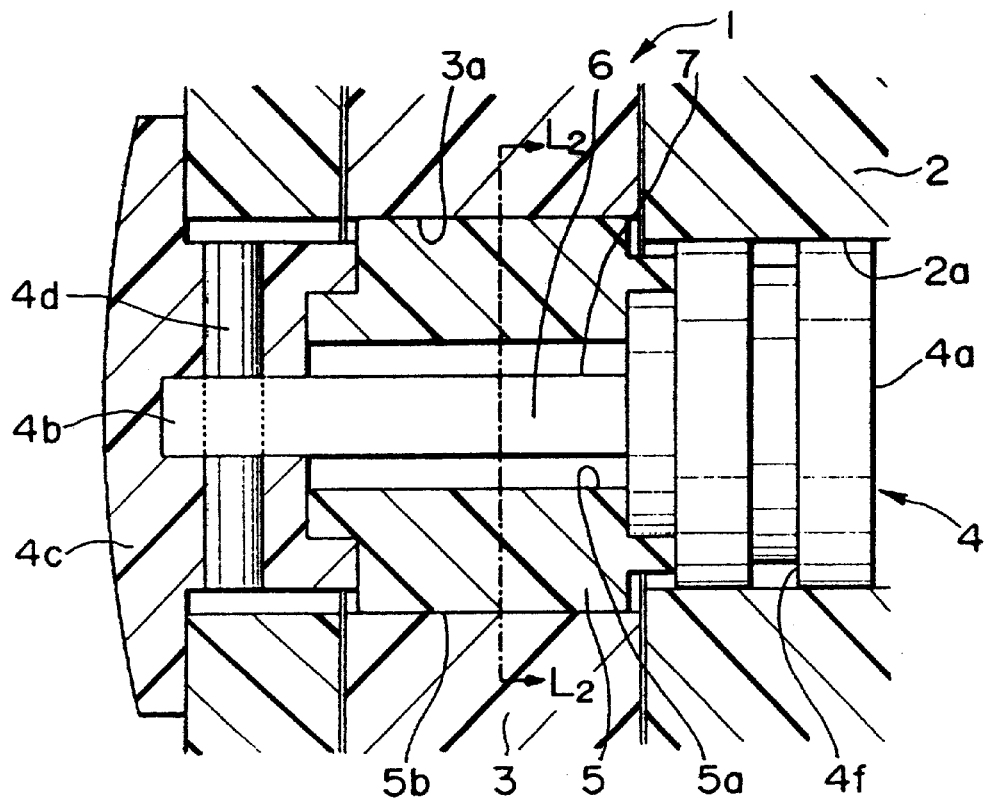
FIG. 3 is a cross section of the hinge device of the first embodiment according to the present invention when the movable member is rotated relative to the stationary member by 90 degrees.

As shown in FIGS. 1 and 3, the hinge device 1 for interconnecting a phone body 2 (first member) with a transmitter 3 (second member) for relative rotational movement, is comprised of a movable member 5 attached to the phone body 2 and a stationary member 4 attached to the transmitter 3. The stationary member 4 extends through the movable member 5 to be rotationally received therein in frictional engagement with the interior surface.

The stationary member 4 is made of hard material such as metal, plastic, and is comprised of a stationary base 4a secured to the phone body 2, and a pivot rod 4b extending from the stationary base 4b. Reference numeral 4c denotes a cap fixed to the end of the pivot rod 4b with a pin 4d.

The stationary base 4a has a circular flange shape, which includes two flat portions on its circumferential surface. The flat portions engage a hole of the phone body 2, thereby preventing rotation of the stationary base 4a. Reference numeral 4f denotes a groove for receiving a pin (not shown), which prevents the stationary base 4a from shifting in a direction of an axis of the pivot rod 4b.

The pivot rod 4b has an approximately columnar shape, which includes two flat portions 7 depressed into its circumference over the full length of the pivot rod 4b, forming second rod friction regions 7 while the other circumferential surfaces 6 form first rod friction regions 6.

Figure 2:
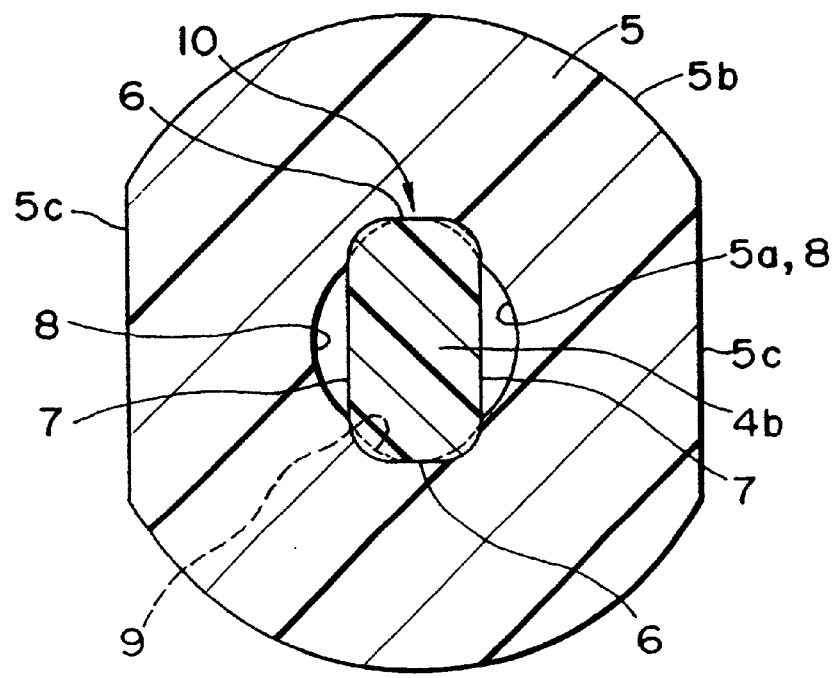
FIG. 2 is a cross section from line L1—L1 in FIG. 1.
Figure 4:
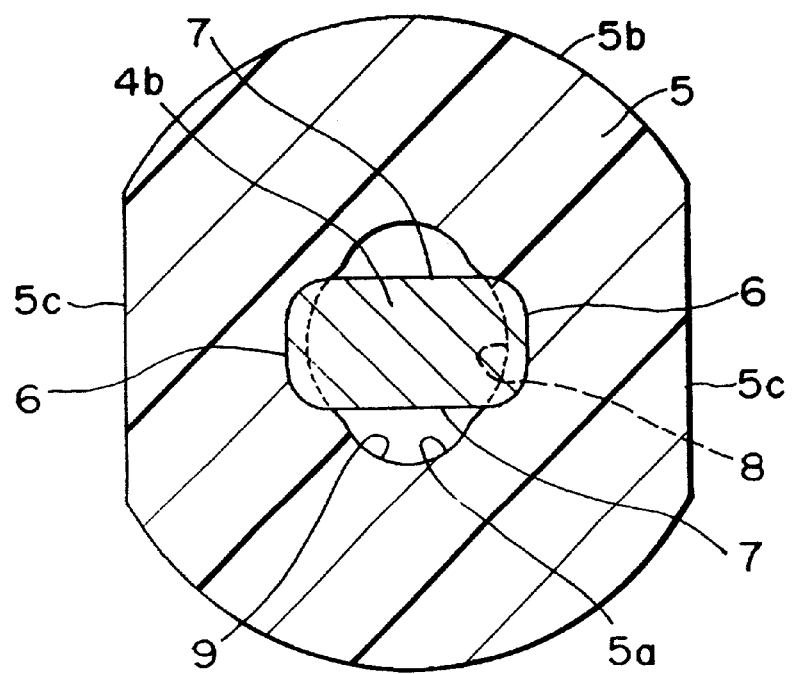
FIG. 4 is a cross section from line L2—L2 in FIG. 3.
Figure 5:
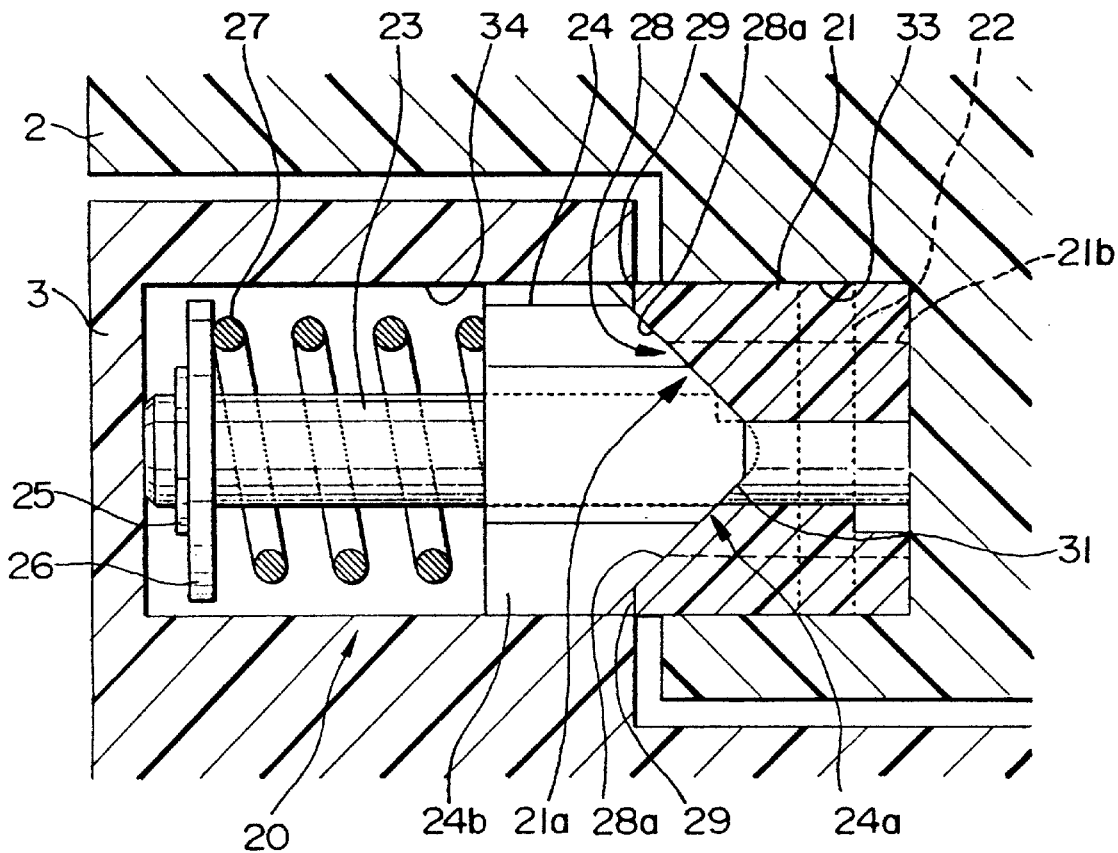
FIG. 5 is a cross section of a hinge device of a second embodiment according to the present invention which is connected with the first embodiment, when the movable cam engages the second cam.

The movable member 5 is a thick sleeve of, for example, soft plastic, which includes a through hole 5a in which the pivot rod 4b is rotationally received. As shown in FIGS. 2 and 4, the movable member 5 includes parallel flat portions 5c upon its circumferential surface, which engage a hole 3a of the transmitter 3 in order to prevent the movable member 5 from being rotated relative to the transmitter 3.

The circular through hole 5a includes concavities (grooves) 9 longitudinally recessed into its interior surface, forming second interior friction regions (contact regions) 9 while the other interior surfaces 8 forms first interior friction regions (contact regions) 8. That is, the first interior friction regions 8 face each other, and the second interior friction regions 9 face each other. The friction regions 8 and 9 are located in a manner such that the distance between the second contact regions 9 is greater than the distance between the first contact regions 8. The friction regions 8 and 9 extend in the direction of the axis of the pivot rod 4b and are located in the circumferential direction of the interior surface of the movable member 5. The interior friction regions 8 and 9 for exerting different friction forces to the pivot rod 4b, constitute a friction reduction means 10.

As shown in FIGS. 2 and 4, the outside diameter between the first rod friction regions 6 of the pivot rod 4b is substantially greater than the inside diameter between the first interior friction regions 8 in the through hole 5a, while the outside diameter is slightly greater than the inside diameter between the second interior friction regions 9.

The outside diameter at the second rod friction region 7 on the pivot rod 4b is substantially smaller than the inside diameter of the first and second interior friction regions 8 and 9 in the through hole 5a.

The pivot rod 4b is rotated in the through hole 5a when the transmitter 3 is opened from the phone body 2. As is perhaps best shown in FIG. 4, the first rod friction regions 6 are pressed onto the first interior friction regions 8 with considerable pressure, thus maximizing frictional resistance therebetween, while the second friction regions 7 and 9 are spaced apart.

In FIG. 2, the first rod friction regions 6 are pressed onto the second interior regions 9 with less pressure, thus minimizing the frictional resistance therebetween, in which position the second rod friction regions 7 are spaced apart from the first interior friction regions 8 onto which no friction force is provided.

The friction force is minimized when the first rod friction regions 6 completely engage the second interior friction regions 9, whereas it is maximized when the first rod friction regions 6 completely engage the first interior friction regions 8. Medium friction forces are provided in the other rotated positions, in which the first rod friction regions 6 contact both the first and second interior friction regions 8 and 9.

As shown in FIG. 4, the first circumferential and interior friction regions 6 and 8 mutually contact to provide the maximum holding force on the rotated transmitter 3, which can be held and maintained at any chosen pivot angles from the phone body 2 even when a user releases his hold of the transmitter 3. The arrangement of the hinge device allows step-less angle adjustment for the transmitter 3 with respect to the phone body 2.

As shown in FIG. 2, the first rod friction regions 6 contact the second interior friction regions 9 to provide the reduced holding force on the transmitter 3, which is therefore more easily rotated than in the above positions. A biasing means, such as a spring, for biasing the transmitter 3, may be provided in order to reduce the rotational resistance.

The hinge device 1 allows for frictional engagement to retain the transmitter 3 relative to the phone body 2 at selectively variable angles, as well as variation of the friction force between the first and second members 4 and 5 in the predetermined range of pivot angle, based on the relationship between the friction regions 6 to 9 of the stationary and movable members 4 and 5.

It should be noted that although in this particular embodiment two flat portions 7 and two concavities 9 are symmetrically disposed by 180 degrees, respectively, their numbers and angles may be changed if desired or deemed necessary in a given application. One skilled in the art will readily recognize that the position of the flat portion 7 and the concavity 9 depend on the desired angles in which the friction forces acting on the stationary and movable members 4 and 5 are reduced. The numbers of the flat portion 7 and the concavity 9 depend on the desired number of positions in which the friction forces acting on the stationary and movable members 4 and 5 are reduced.

Although the flat portions 7 and the concavities 9 of the friction reduction means 10 change the pressure acting on the stationary and movable members 4 and 5 in order to adjust the friction resistances, various friction reduction mechanisms such as a means having surfaces with different coefficients of friction in order to adjust the friction resistances, may be substituted for the flat portions 7 and the concavities 9. It should be noted that although the embodiment employs the pivot rod 4b and the cylindrical movable member 5, friction plates contacting coaxially and mutually may be employed as stationary and movable members.

Second Embodiment

Referring to FIGS. 5 to 14, a second embodiment of a hinge device according to the present invention, will be explained. The cellular phone has the hinge device (first hinge device) 1 of the first embodiment at one end of the pivot of the transmitter 3 and a hinge device (second hinge device) 20 at the other end, which is shown in FIGS. 5 to 14.

The hinge device 20 is comprised of a stationary cam 21, a shaft 23 attached to the stationary cam 21 by means of a pin 22, a movable cam 24 which is rotatable and slidable in a direction of the rotation axis, a flange 26 fixed to one end of the shaft 23 by means of a C-shaped ring 25, and a coil spring 27 provided between the movable cam 21 and the flange 26 in order to bias the movable cam 24 toward the stationary cam 21.

The stationary cam surface 21a, which is formed upon one edge surface of the cylindrical stationary cam 21, defines a concavity (groove) 28 extending on a diameter of the stationary cam 21 and flat friction surfaces 29 adjacent to the concavity 28 perpendicularly to the axis. The concavity 28 has a V-shape, which are formed gradually wider toward the friction surfaces 29, forming pairs of inclined portions 28a.

The stationary cam 21 includes flat stopper portions (rotation stopping means) 21b depressed into the circumference surface, which are adapted to firmly engage the phone body 2, thus preventing rotation of the stationary cam 21 and locating the phase of the concavity 28 with respect to the phone body 2. That is, the concavity 28 is accurately positioned at predetermined angles relative to the phone body 2 when the stationary cam 21 is secured to the phone body 21 by means of the flat stopper portions 21b.

The movable cam surface 24b defines a trapezoid projection 31 which is adapted to engage tightly with the concavity 28, forming a complement to the stationary cam surfaces 21a of the stationary cam 21.

The stationary and movable cams 21 and 24 are disposed so that the cam surfaces 21a and 24a face each other to allow the projection 31 to engage the concavity 27 in every rotation of 180 degrees of the movable cam 24. The movable cam 24 includes flat stopper portions 24b depressed into the circumference surface in a manner similar to the above described flat stopper portions 24b.

The hinge device 20 interconnect the phone body 2 and the transmitter 3 as shown in FIGS. 5 to 14. The stationary cam 21 is inserted into the hole 33 on the side of the cellular phone 2, at which position rotation of the stationary cam 21 is prevented since its cross section tightly corresponds to the hole 33.

The distal end of the shaft 23, the flange 26, the coil spring 27, and the movable cam 24 are included into a hole 34 on the transmitter 3. The hole 35 includes interior guide surfaces 35 (shown in FIG. 7) in contact with the flat stopper portions 24b on the circumference of the movable cam 24. This arrangement allows the movable cam 24 in the hole 34 to slide in the longitudinal direction and prevents the movable cam 24 from being rotated relative to the transmitter 3. The movable cam 24 is rotated while sliding in the axis direction when the transmitter 3 is opened from the phone body 2.

Figure 6:
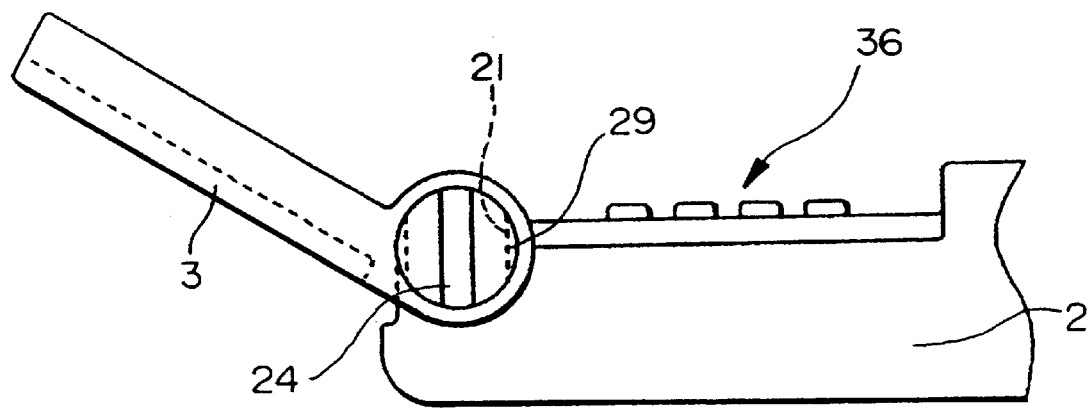
FIG. 6 is a side view of a cellular telephone with the hinge device in FIG. 5, when the cams are positioned as shown in FIG. 5.

Because of the above described hinge device 20 in the cellular phone 2, the projection 31 on the movable cam 24 tightly engages the concavity 28 on the stationary cam 21 when the transmitter 3 is rotated by approximately 150 degrees relative to the phone body 2. FIG. 6 shows the movable cam surface 24a with solid lines, which is substantially concealed, and the stationary cam surface 21a with dashed lines.

Figure 7:
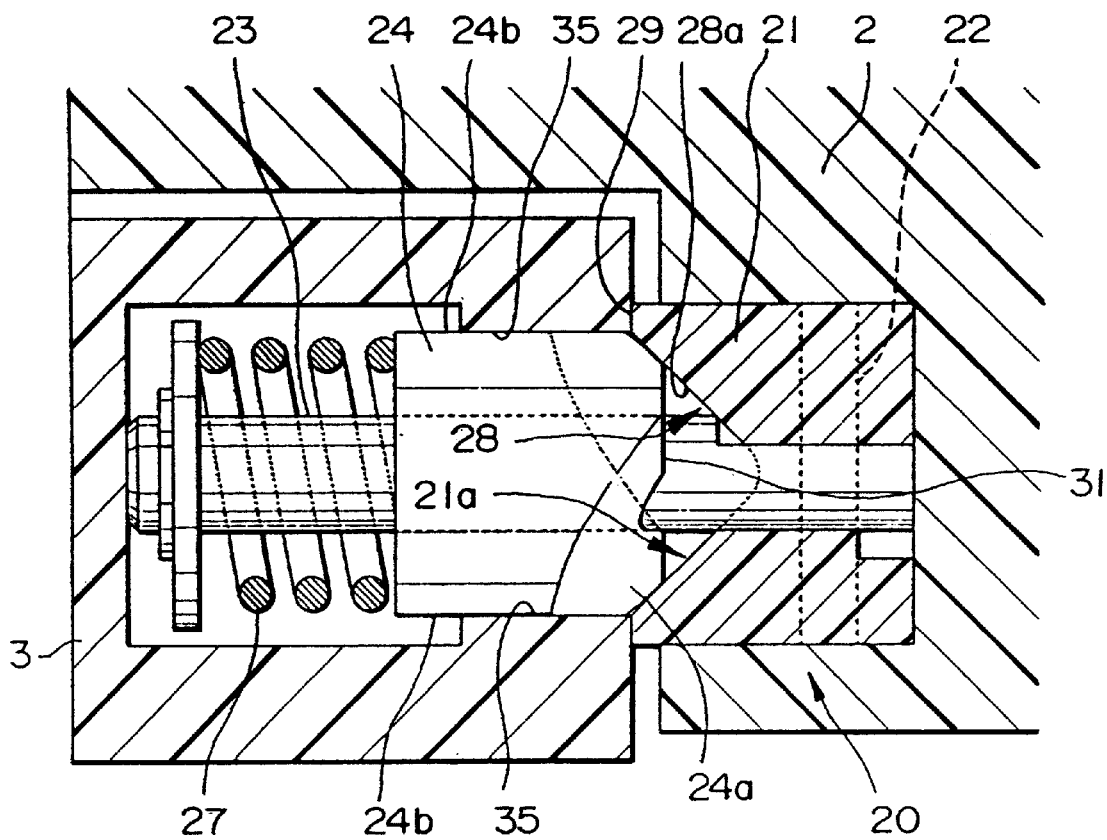
FIG. 7 is a cross section of the hinge device of the second embodiment according to the present invention, when the projection of the movable cam is positioned on an inclined surface of the stationary cam.
Figure 8:
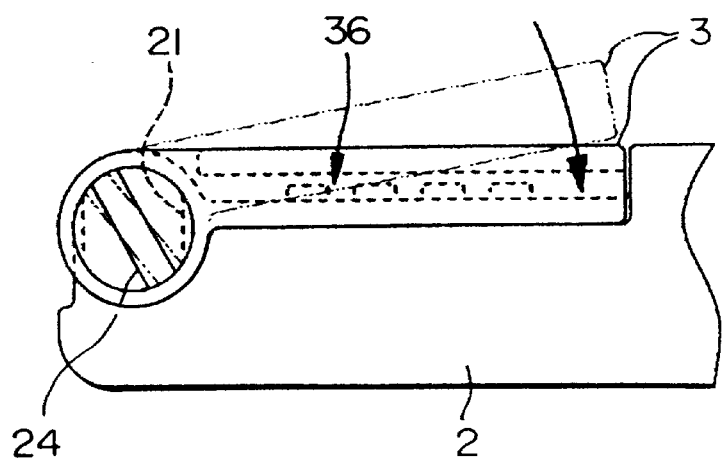
FIG. 8 is a side view of the cellular telephone when the cams are positioned as shown in FIG. 7.
Figure 9:
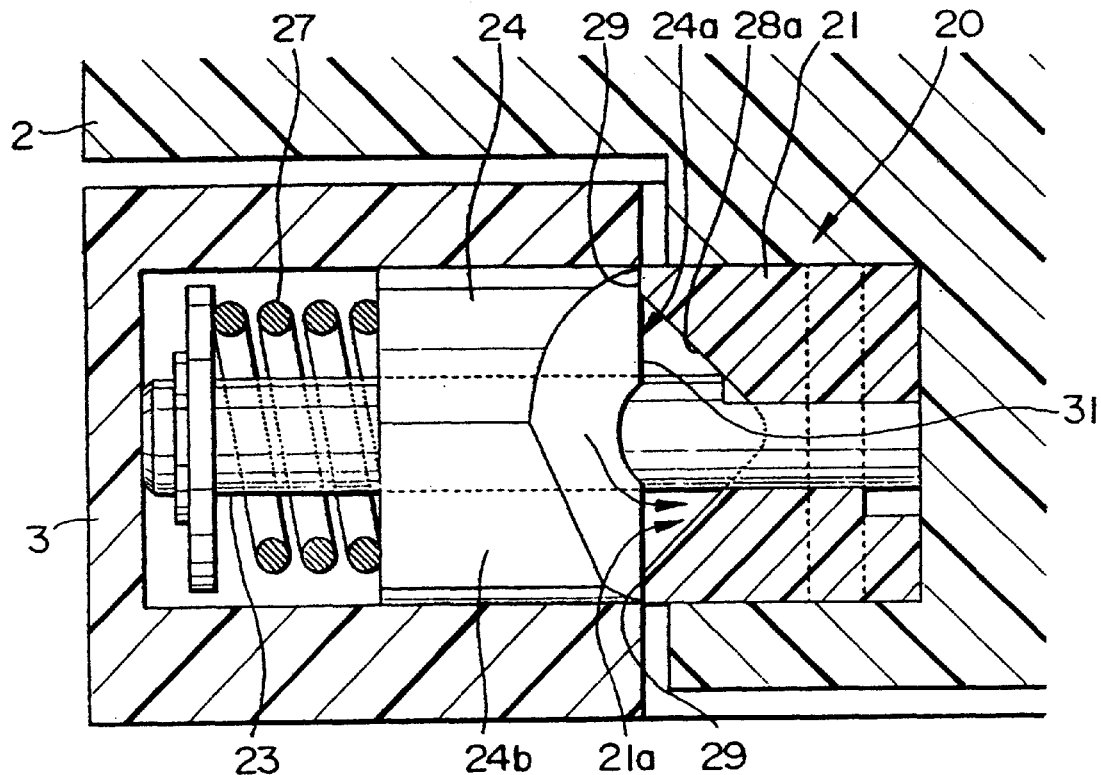
FIG. 9 is a cross section of the hinge device of the second embodiment according to the present invention, when the projection of the movable cam is positioned on a friction surface of the stationary cam.

The projection 31 is entering the inclined faces 28a to be about to engage the concavity 28 as shown in FIG. 7, when the transmitter 3 is closed on the keyboard 36 on the phone body 2 at 0 degrees with respect to the phone body 2 as shown in FIG. 8. This engagement is carried out in unison with the hinge device 1 of the first embodiment at the other end of the axis, where the first interior-friction regions 6 of the stationary member 4 are also entering the second rod friction regions 9 of the movable member 5.

The coil spring 27 biases the movable cam 24 toward the stationary cam 21 so that the projection 31 slides down on the inclined faces 28a to engage the concavity 28, thus providing the rotational force on the transmitter 3 as shown in FIG. 8 with the arrow. The other hinge device 1 reduces the friction force because the first rod friction regions 6 are entering the second interior friction regions 9. The movable cam 24 is therefore smoothly rotated on the inclined faces 28a of the stationary cam 21 because of the biasing force of the coil spring 27.

Figure 10:
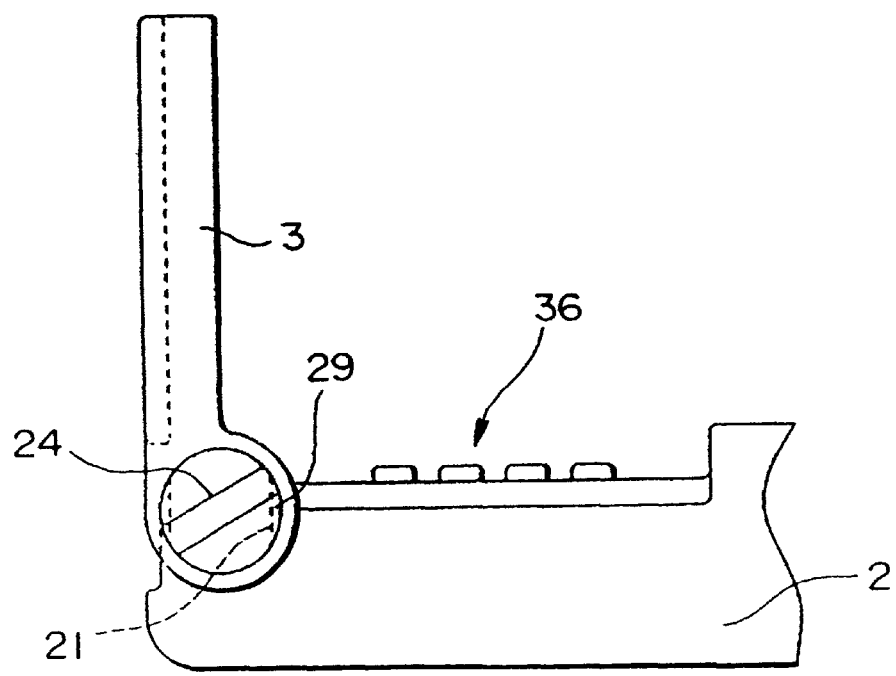
FIG. 10 is a side view of the cellular telephone when the cams are positioned as shown in FIG. 9.

In FIG. 10, the movable cam 24 is rotated against the biasing force of the coil spring 27 so that the projection 31 is released from the concavity 28 and contacts the friction regions 29, when a user opens the transmitter 3 from the phone body 2 to dispose the keyboard 36.

Although the coil spring 27 has biased the transmitter 3 toward the closed position on the phone body 2 until release of the projection 31 from the concavity 28, the biasing force by the coil spring 27 is applied only to press the released projection 31 onto the flat friction surfaces 29, thus providing friction resistance between the tip of the projection 31 and the friction surfaces 29 in the absence of rotational moments. The transmitter 3 is held at the rotated position until a force is applied to overcome the friction resistance, keeping the transmitter 3 and the phone body 2 in engagement. This configuration allows the transmitter 3 to be adjusted at any variable angle relative to the phone body 2.

The first rod friction regions 6 completely engage the first interior friction regions 8 in the hinge device (first hinge device) 1, which provides the maximum friction force in addition to the friction force by the hinge device (second hinge device) 20, thus firmly holding the transmitter 3 at the rotated position. The friction forces are preferably set to minimum values to hold the transmitter 3 against the force of gravity, thus reducing frictional wear of the projection 31 and the flat friction surfaces 29 while providing easy manipulability for a user.

Figure 11:
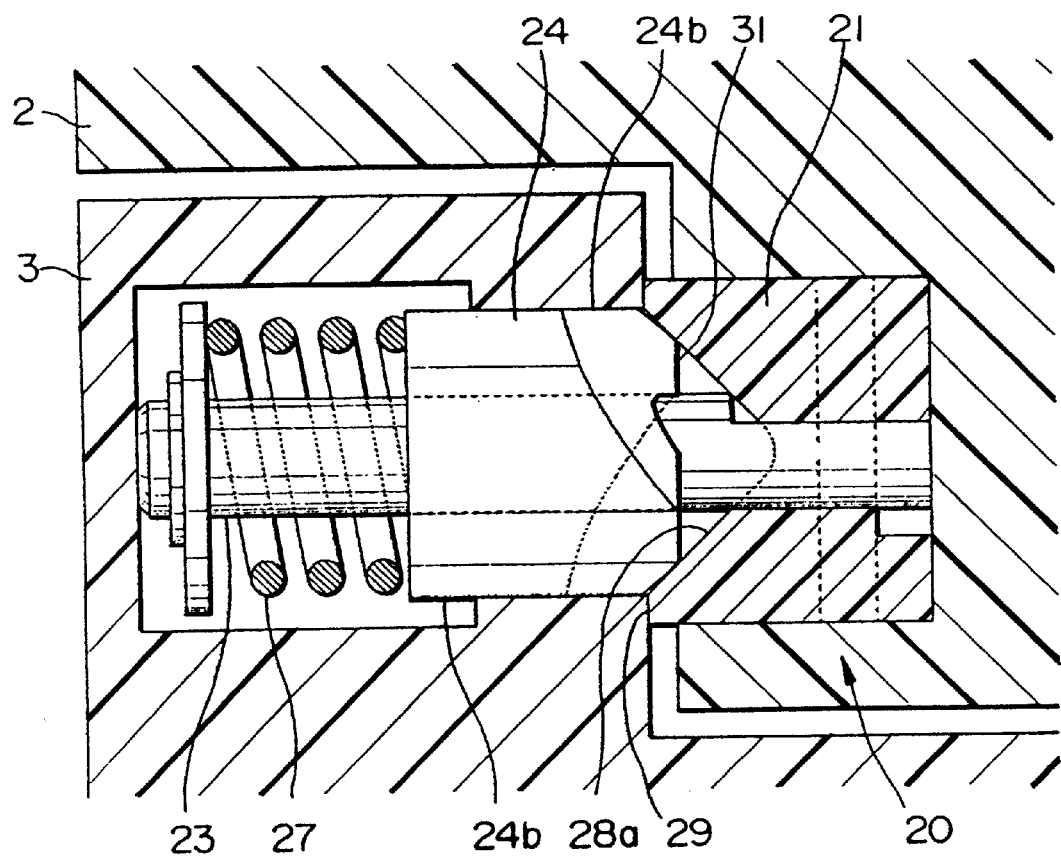
FIG. 11 is a cross section of the hinge device of the second embodiment according to the present invention, when the projection of the movable cam, which is rotated by 120 degrees from the position as shown in FIG. 7, is positioned on an inclined surface of the stationary cam.
Figure 12:
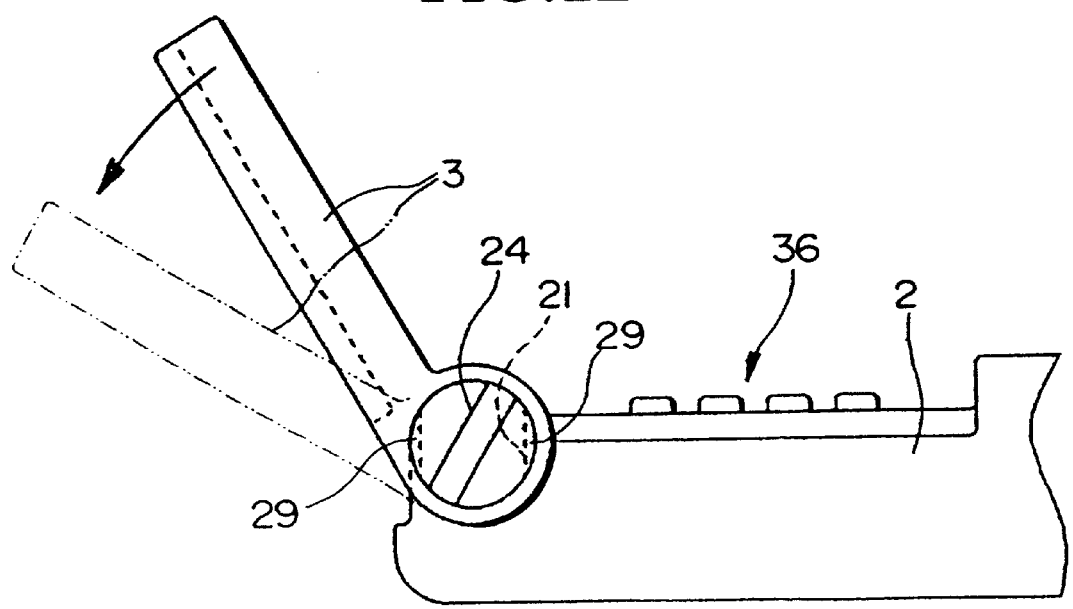
FIG. 12 is a side view of the cellular telephone when the cams are positioned as shown in FIG. 11.

The tip of the projection 31 is entering the inclined face 28a of the concavity 28 as shown in FIG. 11, when the transmitter 3 is rotated to a position of 120 degrees relative to the phone body 2 as shown in FIG. 12. The coil spring 27 provides a biasing force to slide down the projection 31 along the inclined face 28a. The first hinge device 1 reduces the friction force on the stationary and movable members 4 and 5 since the first rod friction regions 6 are entering the second interior friction regions 9. The transmitter 3 is thus automatically rotated to the opened position shown in FIG. 12 with dashed lines by 150 degrees from the phone body 2, so that the projection 31 engages the concavity 28.

Figure 13:
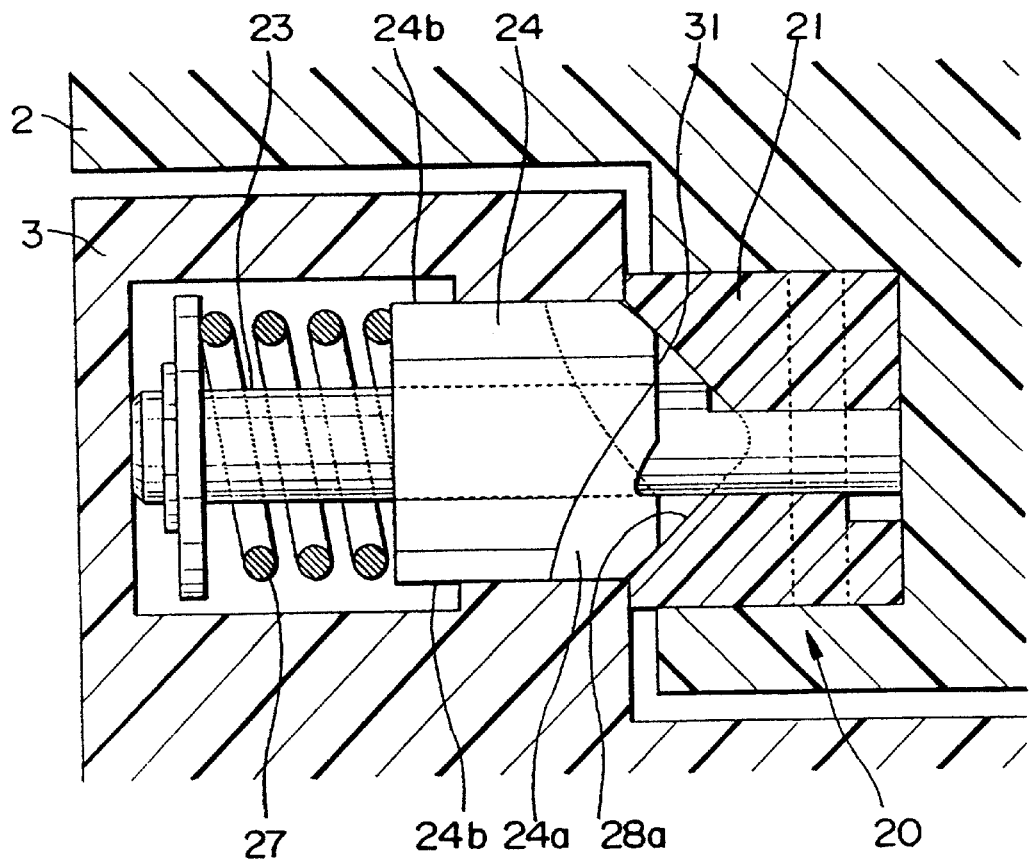
FIG. 13 is a cross section of the hinge device of the second embodiment according to the present invention, when the projection of the movable cam, which is rotated by 180 degrees from the position as shown in FIG. 7, is positioned on an inclined surface of the stationary cam.
Figure 14:
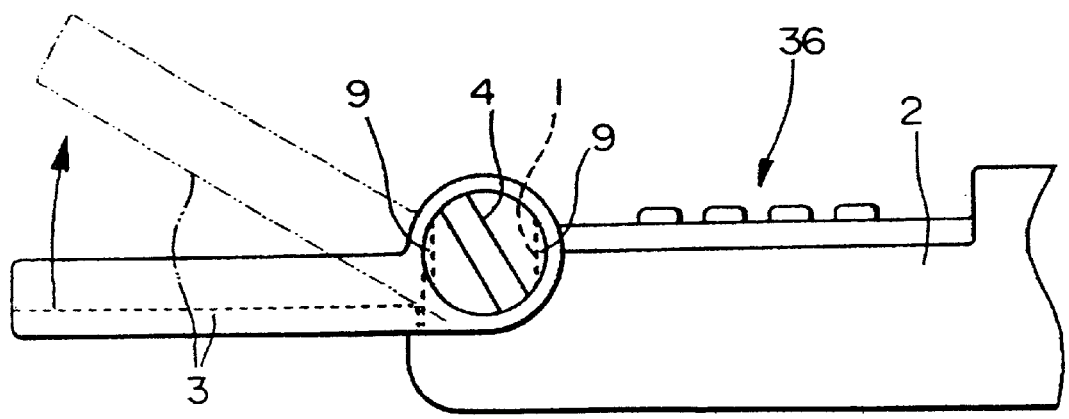
FIG. 14 is a side view of the cellular telephone when the cams are positioned as shown in FIG. 13.

Even when the transmitter 3 is rotated by more than 150 degrees, for example, to 180 degrees from the phone body 2 as shown in FIG. 14, the projection 31 passes the completely engaging position in the concavity 28. The projection 31 still remains on the inclined faces 28a as shown in FIG. 13, thus providing a rotational force to reverse the transmitter 3 to the opened position. The transmitter 3 is therefore automatically returned to the opened position in the direction indicated with the arrow in FIG. 14, when a user release hold of the transmitter 3.

This hinge devices provide enhanced manipulability, for example, when the user operates the transmitter 3 to receive a call. The transmitter 3 is firmly held at the opened position until a force to release the projection 31 from the concavity 28 is applied to the transmitter 3 even when the user lies down or looks up with the cellular telephone in his hand. This configuration also avoids damage due to excessive stress on the hinge devices because the transmitter 3 is automatically returned to the opened position even when it is excessively rotated.

After finishing a telephone call, a user may exert a force on the transmitter 3 to move the movable cam 24 against the biasing force of the coil spring 27. The coil spring is compressed so that the projection 31 is released from the concavity 28 and engages the flat friction surfaces 29, in which range the transmitter 3 can be easily rotated with a force less than the force to release the projection 31 from the concavity 28.

As shown in FIG. 12, as the transmitter 3 approaches the phone body 2 as shown with double-dotted dashed lines in FIG. 12, the projection 31 is entering the inclined faces 28 in the concavity 28 while, in the first hinge device 1, the first rod friction regions 6 is entering the second interior friction regions 9. The transmitter 3 is therefore biased toward the closed position with a small friction force.

The transmitter 3 is automatically rotated as it approaches close to the phone body 2 and is held at the closed position. It is therefore unnecessary to close completely and manually the transmitter 3 on the phone body 2 after finishing a telephone call.

Such a configuration eliminates a lock mechanism for holding the transmitter 3, making the construction simpler. The hinge device may be combined with a lock mechanism such as a "snap lock". Moreover, the transmitter 3 is prevented from being accidentally opened when it is carried in a bag, from malfunctioning through the keyboard, and from being caught in a bag.

The hinge device of the present invention is not limited to the above embodiments, and obviously modifications and variations described below are possible. Although the concavity 28 on the stationary cam 21 is a V-shaped cut in the embodiment, it may be a trapezoid- or semicircular-shaped cut having inclined faces 28a. The projection 31 may be triangular or semicircular.

The angle between the opened and closed positions is not limited to 150 degrees but may be any desired angle, for example, 160 degrees. Although in the preferred embodiment the concavity 28 is disposed on the diameter of the stationary cam 21 so as to engage the movable cam 24 by its rotation of 180 degrees, more than two concavities may be provided to be parallel to the diameters, and one projection may be provided on a radius of the movable cam 24, thus provided engagement between the transmitter 3 and the phone body 2 in more than two preselected positions. A number of concavities at regular angles, and the same number of the projections for simultaneously engaging the concavities, may be provided. The coil spring 27 may be substituted for other biasing means made of resilient material, for example, a disc spring.

Although in the preferred embodiment the stationary cam 21 is attached to the phone body 2 and the movable cam 24 is attached to the transmitter 3, the movable cam 24 may be attached to the phone body 2 and the stationary cam 21 is attached to the transmitter 3.

Figure 15:
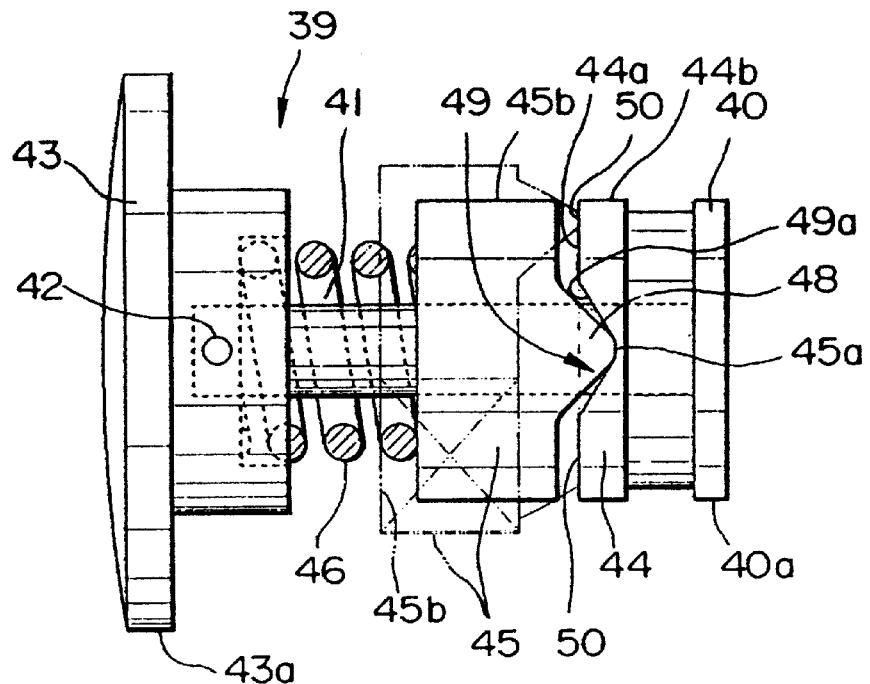
FIG. 15 is a side view of a modification of a hinge device according to the present invention.
Figure 16:
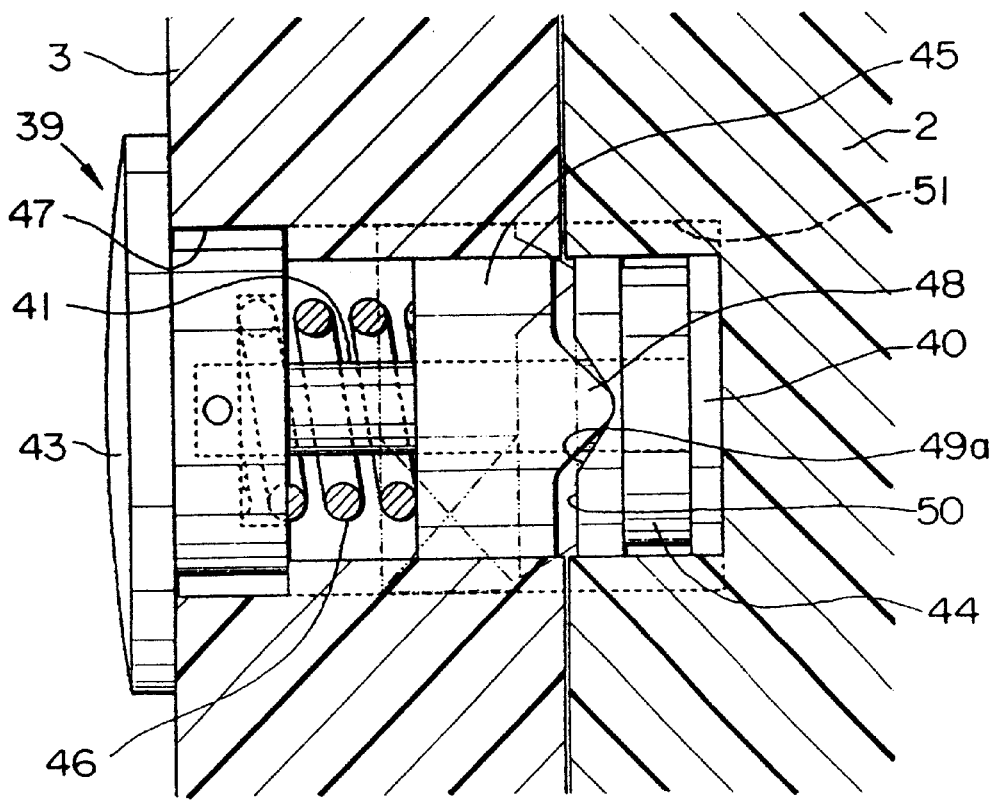
FIG. 16 is a cross section of the hinge device of FIG. 15 which is mounted in the cellular telephone.

A hinge device 39 shown in FIGS. 15 and 16 may be substituted for the hinge device 20. The hinge device 39 is comprised of a shaft 41, a cap 43 attached to one end of the shaft 41 by means of a pin 42, ring-shaped stationary and movable cams 44 and 45 in which the shaft 41 is received in a rotatable and slidable manner, and a coil spring 46 for biasing the movable cam 45 toward the stationary cam 44. The cams 44 and 45 are positioned between the cap 43 and the flange 40 so that cam surfaces 44a and 45a at ends of the cams 44 and 45 face each other, while the coil spring 46 is positioned between the movable cam 45 and the cap 43.

The cap 43 has a flange 43a for covering a hole in the transmitter 3, forming the exterior surface. The stationary and movable cams 44 and 45 have a projection 48, a concavity 49, and inclined faces 49a, in a similar fashion to the second embodiment.

The stationary cam 44 and a base of the shaft 41 have flanges 40 corresponding to a hole 51 in the phone body 2, which flanges 40 includes flat portions on their circumference surface to engage the hole 51, thus preventing rotation of the stationary cam 44 relative to the phone body 2. The movable cam 45 has two flat portions 45b, which slides in the direction of the rotation axis within the hole 47 in the transmitter 3, preventing the movable cam 45 from being rotated relative to the transmitter 3.

As shown in FIG. 16, the hinge device 39 is inserted through the holes 47 and 51, which are disposed coaxially, from the transmitter 3 into the phone body 2. The flange 40 and the stationary cam 44 are thereby secured in the hole 47 of the phone body, and the movable cam 45 is within the hole 50 of the transmitter 3. The cap 43 is adhered by a bond agent, or is pressed to tightly engage in the transmitter 3.

The movable cam 45 is rotated relative to the stationary cam 44, together with the transmitter 3 rotated by a user. The movable cam 45, guided on the cam surface 45a, slides in the direction of the rotation axis against the biasing force of the coil spring 46, which biases the movable cam 45 toward the stationary cam 44, in a manner similar to the aforementioned embodiment.

In addition to the above advantages of the hinge device 20 of the aforementioned embodiment, the hinge device 39 can be inserted from only one side into the holes 47 and 51 coaxially disposed, thus making the assembling of the cellular telephone simpler and easier.

Figure 17:
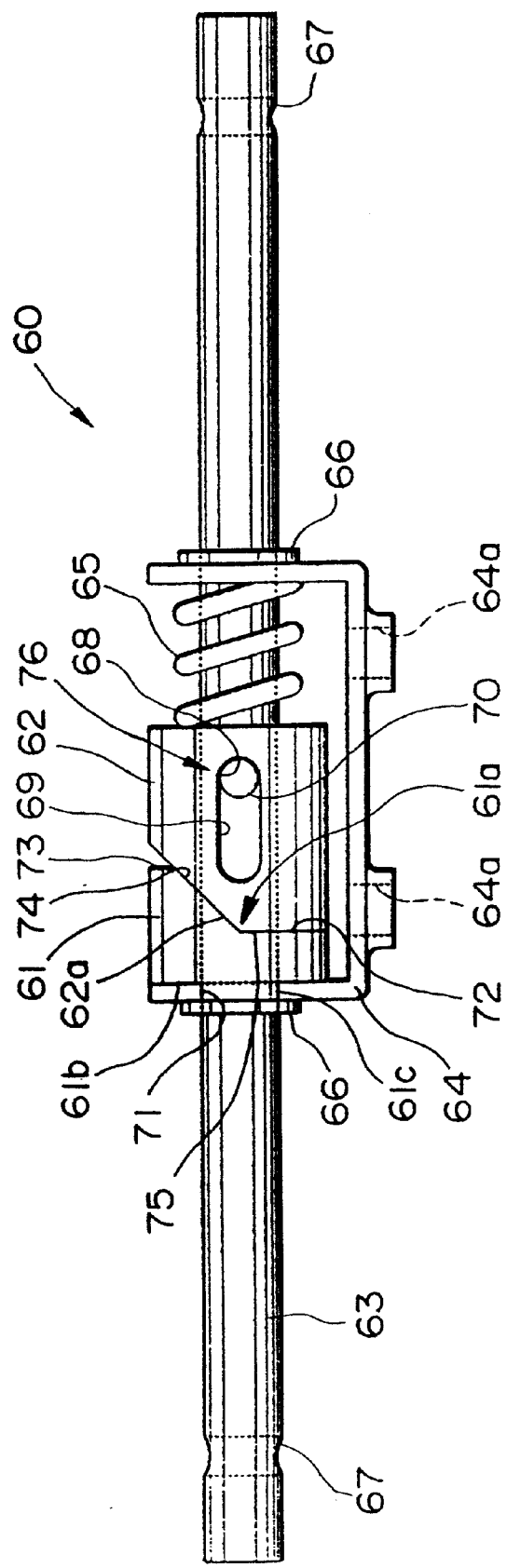
FIG. 17 is a side view of another modification of a hinge device according to the present invention.
Figure 18:
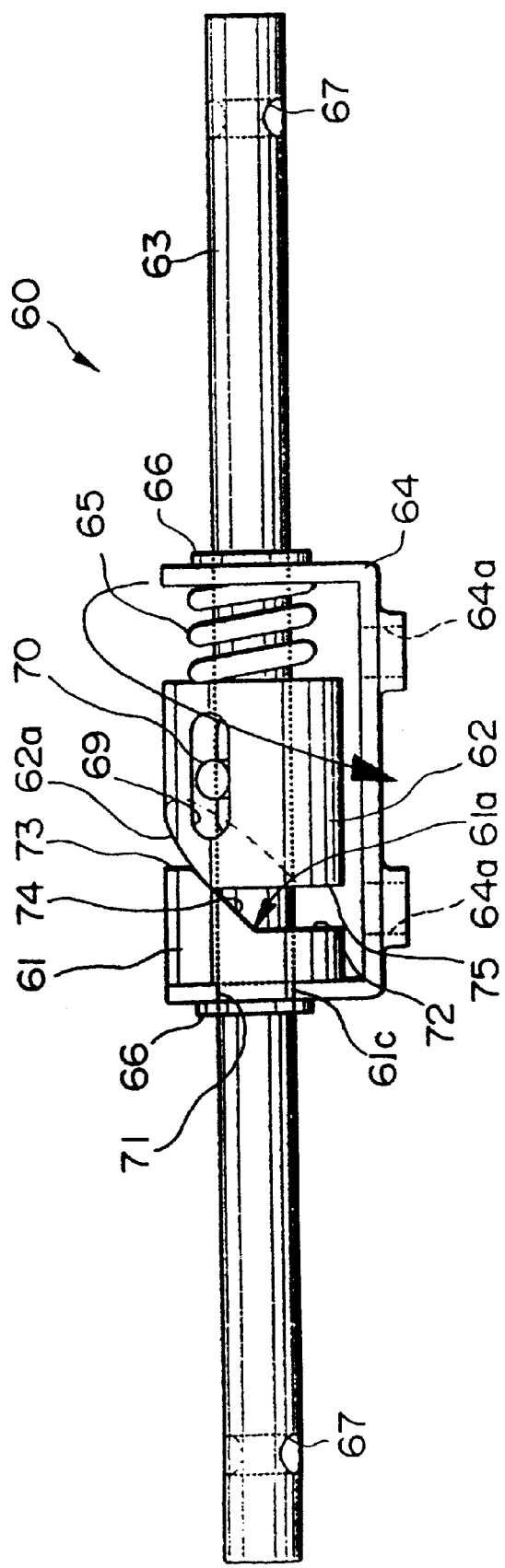
FIG. 18 is a side view of the hinge device of FIG. 17 when a projection of a movable cam, which is rotated by a shaft, is positioned on an inclined surface of a stationary cam.
Figure 19:
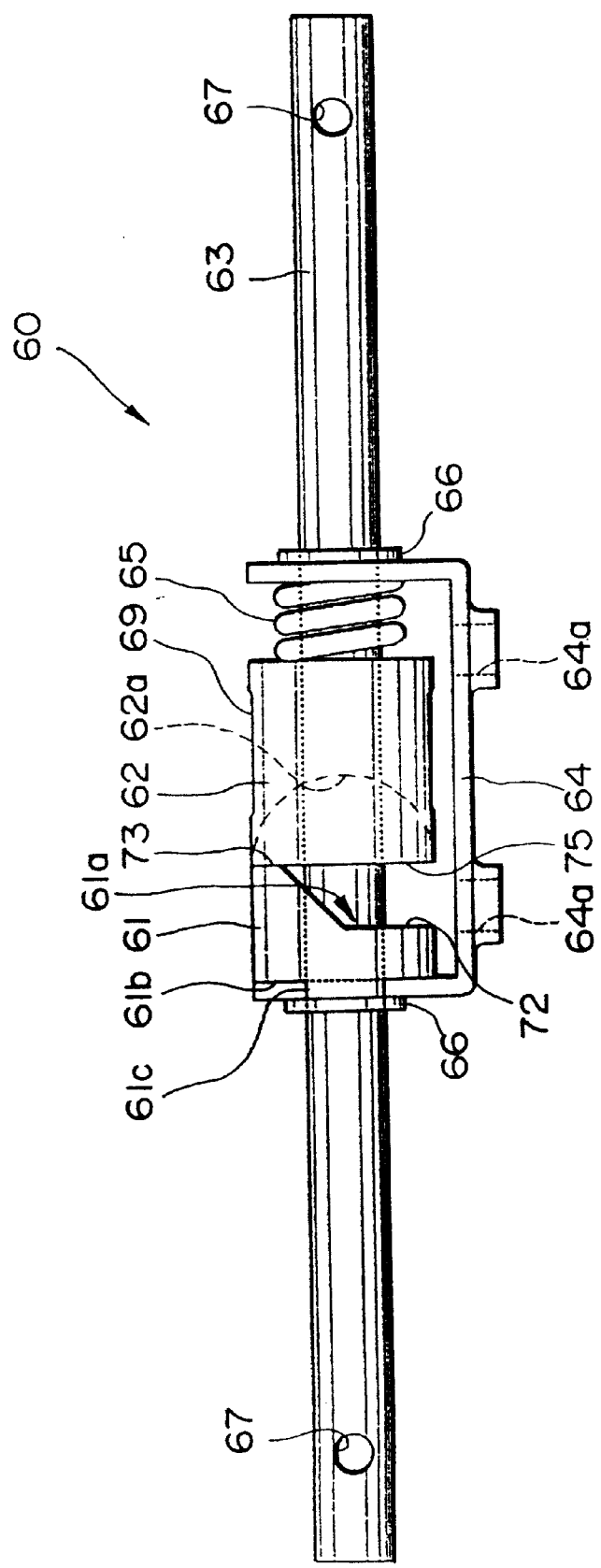
FIG. 19 is a side view of the hinge device of FIG. 17 when the projection of the movable cam is positioned on a friction surface of the stationary cam.

The cellular telephone may have a hinge device 60 shown in FIGS. 17 to 19, in which stationary and movable cams have cam surfaces 61a and 62a which differ in shape from those in the hinge devices 20 and 39.

As shown in FIG. 17, the hinge device 60 is comprised of a longitudinally extending shaft 63, a generally U-shaped bracket 64 for rotatably supporting the shaft 63, stationary and movable cams 61 and 62 through which the shaft 63 is inserted, and a coil spring 65 for biasing the movable cam 62 toward the stationary cam 61. The stationary and movable cams 61 and 62 are disposed within the bracket 64 while the coil spring 65 is disposed between the movable cam 62 and the bracket 64. Reference numeral 66 denotes a C-shaped stopper ring for fixing the shaft 63 in the direction of the axis relative to the bracket 64.

The shaft 63, extending beyond the opposing sidewalls of the bracket 64, has through holes 67 at both ends perpendicularly to the shaft axis, for fixing the shaft 64 to the transmitter 3 by means of pins (not shown), and an additional through hole 68 at the middle perpendicularly to rod axis. A pin 70 within an elongated hole 69 in the movable cam 62, is received through the hole 68.

The stationary cam 61 includes a hole having a female screw 64a on its inside, in which a screw (not shown) is inserted in order to fix the hinge device 60 to the phone body 2. The bracket 64 defines a cut-out portion 71, which is adapted to engage the stationary cam 61.

The cylindrical stationary cam 61 is an edge cam, which includes a contact portion 61b in contact with the bracket 64, a projection 61c adapted to engage the cut-out portion 71, and a cam surface 61a formed upon one edge surface of the stationary cam 61. The cam surface 61a defines a semicircular concavity 72 on one side with respect to the center line, and a friction surface 73 rising from the concavity 72. The friction surface 73 is parallel to the bottom of the concavity 72, which includes a gently inclined surface 74 extending to the friction surface 73.

The movable cam 62, with the identical cross section with that of the stationary cam 61, has a movable cam surface 62a forming a complement to the stationary cam surfaces 61a. The movable cam surface 62a defines a projection 75 for engaging the concavity 72 of the stationary cam 61.

The movable cam 62 includes a hole 69 which is elongated along the axis and is extending radially completely through the movable cam 62. The pin 70 within the hole 68, is received through the elongated hole 69, thus making the movable cam 62 slidable in the direction of the rod axis in the range of the elongated hole 69 and preventing the rotation of the movable cam 62. The elongated hole 69 and the pin 70 therefore work as a rotation engagement means 76.

As shown in FIG. 18, the relationship is made so that the projection 75 of the movable cam 62 is entering the inclined surface 74 in the stationary cam 61, when the transmitter 3 is closed on the phone body 2 as shown in FIG. 8. The coil spring 65 biases the movable cam 62 toward the stationary cam 61 so that the projection 31 is biased to slide down on the inclined surface 74 to engage the concavity 72, thus providing the rotational force to close the transmitter 3 on the keyboard 36 of the phone body 2.

In FIG. 19, the coil spring 65 biases the movable cam 62 toward the closed position during rotation of the transmitter 3 until the projection 75 is completely released from the concavity 72 and comes in contact with the flat friction surface 73. Once the projection 75 has reached the friction surface 73, the biasing force by the coil spring 65 is applied only to presses the projection 75 onto the friction regions 73, thus providing friction resistance between the tip of the projection 75 and the friction surface 73 to hold the transmitter 3 at any rotated positions. This configuration allows the transmitter 3 to be adjusted at any variable angle relative to the phone body 2.

Further, the transmitter 3 is rotated against the friction resistance between the projection 75 and the friction surface 73 when the transmitter 3 is closed. The projection 75 is entering the inclined surface 74, at which point the coil spring 27 provides a biasing force to slide down the projection 31 along the inclined face 28a, so that the transmitter 3 is automatically closed.

The hinge device 60 also allows the transmitter 3 to be adjusted at any variable angle relative to the phone body 2 and to be held at the closed position on the phone body 2.

Third Embodiment

Referring to FIGS. 20 to 27, a third embodiment of a hinge device according to the present invention, will be explained. The hinge device is adapted for an electronic data-book in the embodiment.

Figure 20:
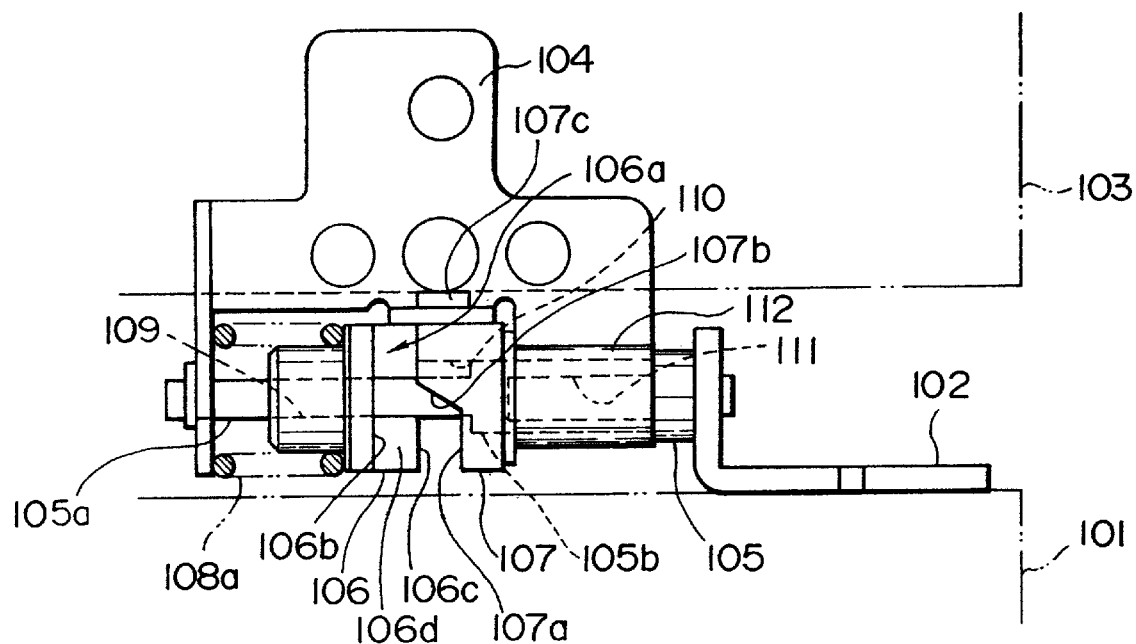
FIG. 20 is a side view of a hinge device of a third embodiment according to the present invention.
Figure 21:
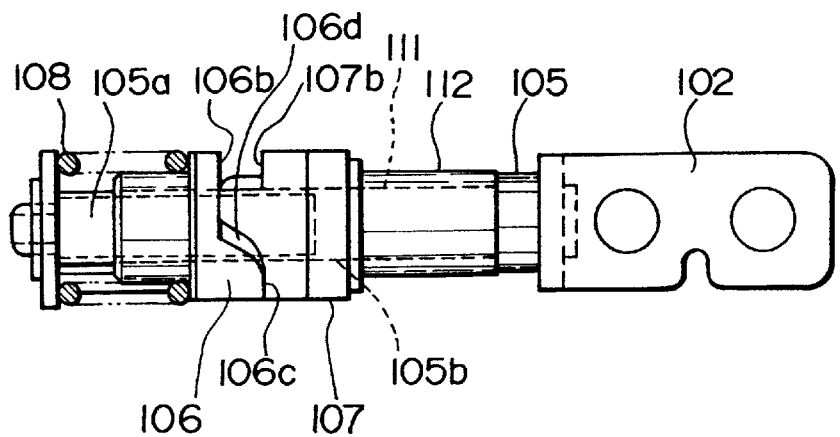
FIG. 21 is a top view of the hinge device of the third embodiment.
Figure 22:
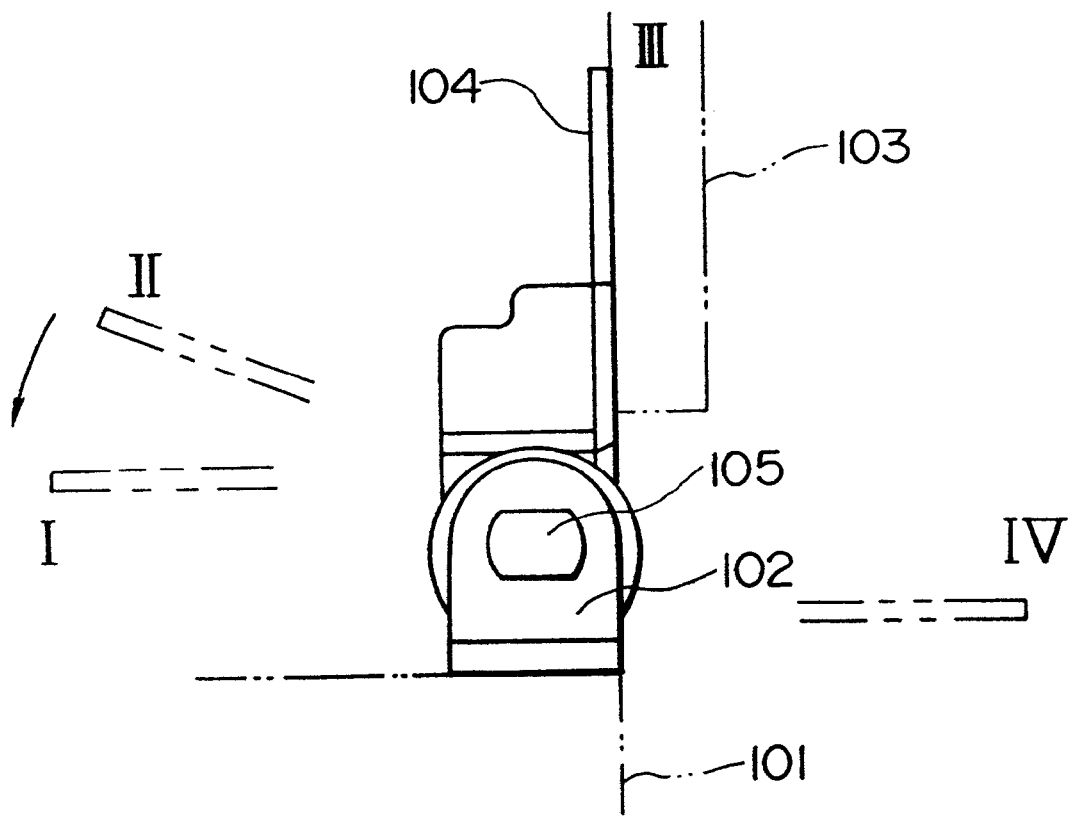
FIG. 22 is a view explaining an operation of the hinge device of the third embodiment.

In FIG. 20, the hinge device is comprised of a stationary bracket 102 fixed to a keyboard 101 (hereinafter referred to as the "main body") of the electronic data-book, a movable bracket 104 fixed to a liquid crystal display 103 (hereinafter referred to as the "lid"), a longitudinally extending shaft 105 fixed to the stationary bracket 102, a stationary cam (second cam) 106 receiving the shaft 105 therein in a slidable manner in the direction of the shaft axis, a movable cam (first cam) 107 attached to the movable bracket 104 and receiving the shaft 105 therein in a rotatable manner, and biasing means 108 of a coil spring for biasing the stationary cam 106 toward the movable cam 107 in the direction of the rod axis.

The stationary and movable cams 106 and 107 are edge cams which include cam surfaces 106a and 107a abutting against one another and are made of plastic or metal. The stationary cam surface 106a, which is formed upon the edge surface of the cylindrical stationary cam 106, defines a semicircular concavity 106b on one side with respect to the center line, and a friction surface 106c which is flat, perpendicular to the rod axis, and adjacent to the concavity 106b on the other side. A gently inclined surface 106d is disposed between the concavity 106b and the friction surface 106c. The movable cam surface 107a upon the movable cam 107 defines a projection 107b which is adapted to engage the concavity 106b, forming a complement to the stationary cam surface 106a. The movable cam 107 includes a projection 107c attached to the movable bracket 104.

The stationary and movable brackets 102 and 104 are manufactured by bending a thin metal plate through a press. The shaft 105 is attached to the stationary bracket 102 by clamping, for example. The shaft 105 includes two parallel flat stopper portions (rotation stopping means) 105a depressed into its circumference surface, to which the stationary cam 106 is attached, while the stationary cam 106 includes a center hole 109 corresponding to the cross section of the flat stopper portions 105a. The stationary cam 106 through which the shaft 105 is inserted, is therefore slidable in the direction of the axis while being prevented from being rotated relative to the shaft 105 by the flat stopper portions 105a engaging the shaft 105.

The shaft 105 includes a column-shaped portion 105b with a circular cross section to which the movable cam 107 is attached. The movable cam 107, which includes a center hole 110 with a circular cross section for receiving the shaft 105, is therefore rotatable relative to the shaft 105. The shaft 105 includes cut-out-portions 111 depressed into its circumference surface, to which a friction element is attached.

The movable bracket 104 includes a hole (not shown) for receiving the projection 107c of the movable cam 107 and a cylindrical friction element 112 integrally formed therewith by curling process, which surrounds the cut-out portion 111 of the shaft 105.

Figure 23:
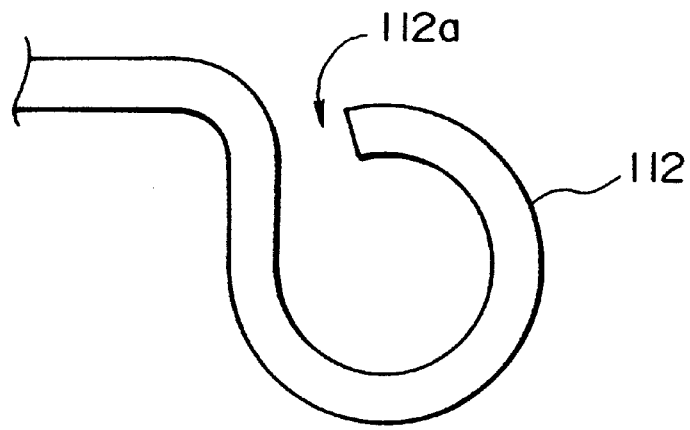
FIG. 23 is a front view of a friction element of the third embodiment when a shaft is not inserted.
Figure 24:
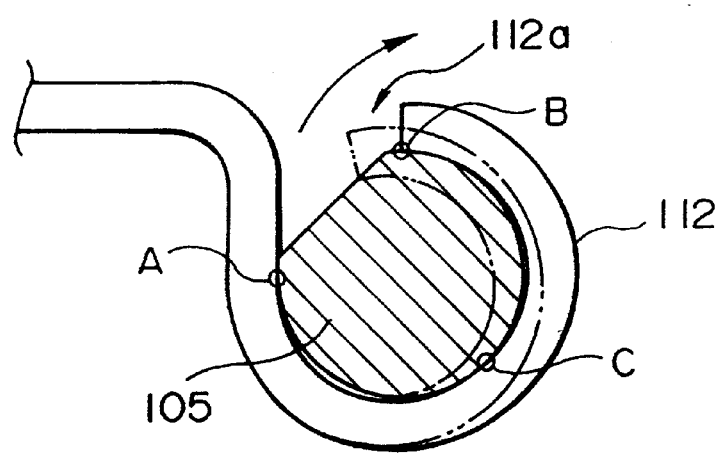
FIG. 24 is a front view of the friction element of the third embodiment when the shaft has been inserted.

As shown in FIG. 23, the friction element 112 has a C-shape cross-section with a gap 112a and an inside diameter greater than the outside diameter of the shaft 105 when the shaft 105 is not inserted. As shown in FIG. 24, when the shaft 105 is inserted, the gap 112a elastically expands from the original position indicated with double dotted dash lines to the deformed position with solid line in the direction with the arrow, so that the interior surface of the friction element 112 contacts the circumference of the shaft 105.

The friction element 112 preferably has an approximately circular interior surface before the insertion of the shaft 105, and elastically deforms to have a C-shape as shown in FIG. 24. The interior surface of the friction element 112 therefore contact the outer circumference surface of the shaft 105 at three points A, B, and C at intervals on the circumference. The points A and B are positioned near the gap 112a, and the point C is the most distant from the points A and B and the gap 112a. That is, the diameter of the friction element 112 mostly expands when it contacts the shaft 105 at the points A, B, and C.

Figure 25:
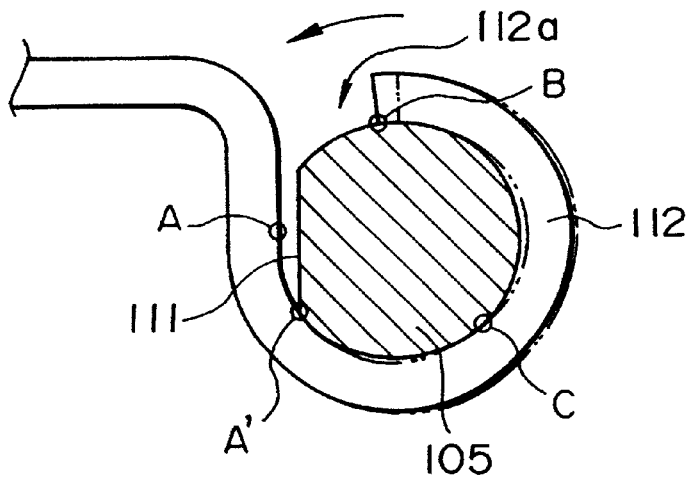
FIG. 25 is a front view of the friction element of the third embodiment when the shaft is rotated within the friction element.
Figure 26:
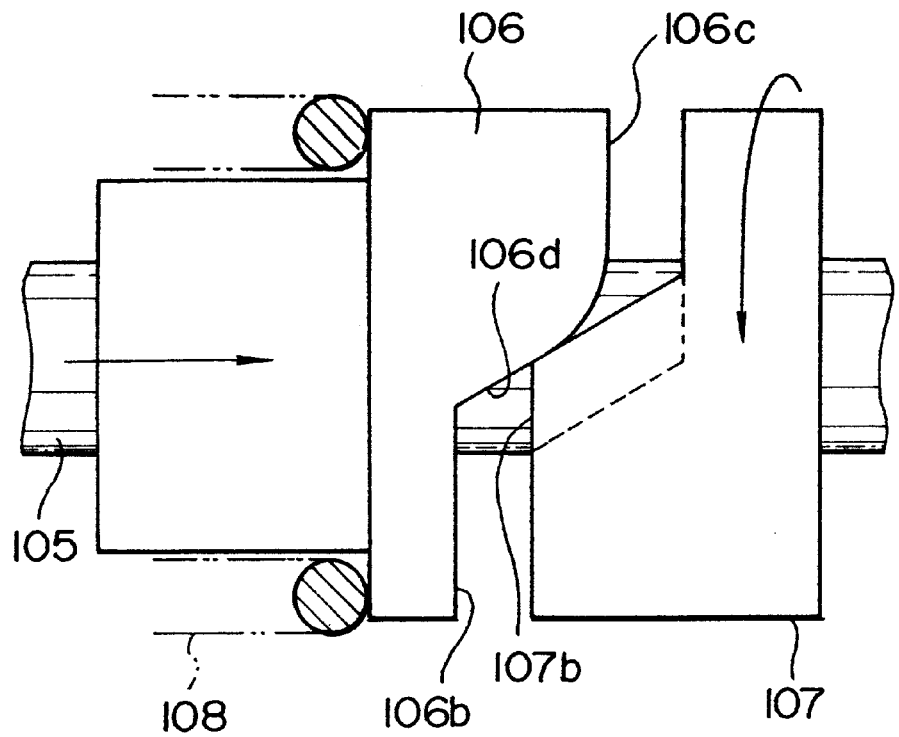
FIG. 26 is a side view of cams of the third embodiment.

The hinge device is secured to the electronic data-book by way of the stationary bracket 102 fixed to the main body 101 and of the movable bracket 104 fixed to the lid 103 in a manner well-known to those skilled in the art. The relationship between the stationary cam 106 and the movable cam 107 is set in a manner such that the projection 107b of the movable cam 107 is positioned on the middle of the inclined surface 106d of the stationary cam 106 as shown in FIG. 26, when the lid 103 is closed on the main body 101. The phase relationship between the cut-out portion 111 and the points A, B, and C is set in a manner such that the cut-out portion 111 is positioned at one of the points A, B, and C as shown in FIG. 25 when the projection 107b of the movable cam 107 is positioned on the middle of the inclined surface 106d of the stationary cam 106. Reference character A' in FIG. 25 denotes a points at which the shaft 105 contacts the friction element 112.

The operation of the hinge device will be explained. The projection 107b of the movable cam 107 is positioned on the middle of the inclined surface 106d of the stationary cam 106 (as shown in FIG. 26) when the lid 103 is closed relative to the main body 101 of the electronic data-book (at a position "I" in FIG. 22). The biasing means 108 biases the fixed cam 107 toward the stationary cam 107 so that the projection 107b is about to slide down on the inclined faces 106d to engage the concavity 106b, thus providing a rotational torque on the lid 103. The lid 103 is therefore held at the closed position on the main body 101, eliminating a lock mechanism.

The projection 107b of the movable cam 107 goes up on the inclined surface 106d when a force to open the lid 103 is exerted and overcomes the torque by the biasing means 108. The projection 107b is moved from the inclined surface 106d onto the friction surface 106c by rotation of the movable cam 107 for a predetermined range of pivot angle. The lid 103 is held at a closed position (a position "III" in FIG. 22) in the absence of the torque to close the lid 103, until an external force is applied to rotate the lid 103.

The friction element 112 contacts the circumference of the shaft 105, thus providing a friction force therebetween which prevents rotation of the lid 103 relative to the main body 101. This provides a "free stop" function in which the lid 103 is held at any chosen position ("III" in FIG. 22) by the friction force.

Figure 27:
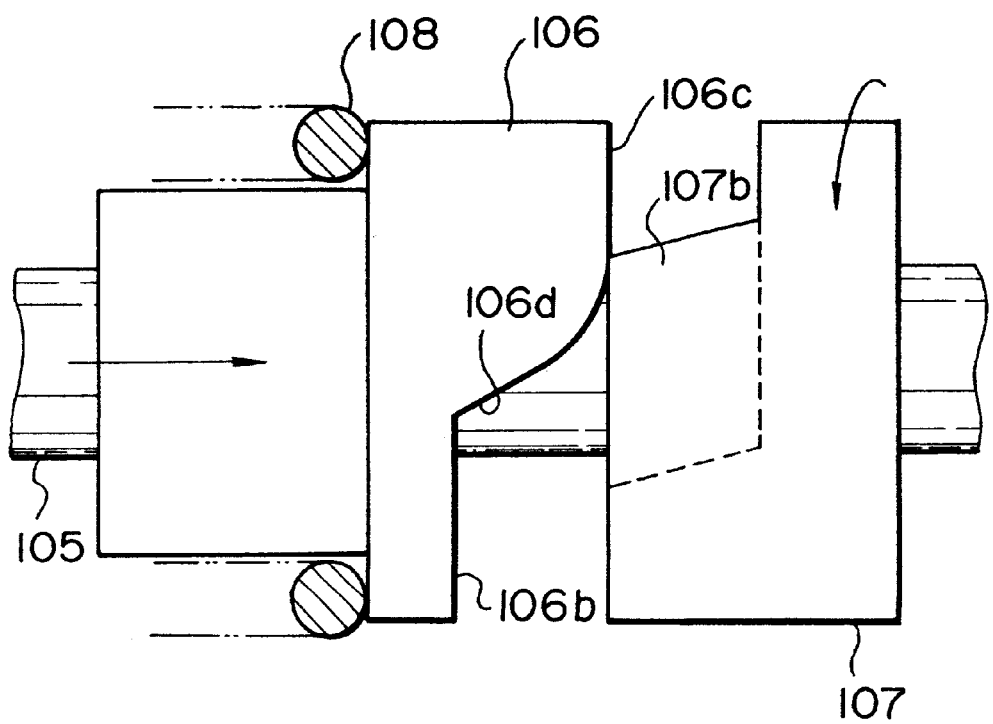
FIG. 27 is a side view of the cams of the third embodiment when the movable cam is rotated.

The lid 103 can be rotated toward the closed position when a force exerted to the lid 103 overcomes the friction force between the friction element 112 and the shaft 105. When the projection 107b is entering the inclined surface 106d of the stationary cam 106 (at the position "II" in FIG. 22, also as shown in FIG. 27), the cut-out portion 111 is spaced apart from the point A and the shaft 105 contact the friction element 112 at the point A', reducing the pressure of the friction element 112 onto the shaft 105. The friction element 112 is slightly diminished in diameter, reducing the friction force.

The movable cam 107 is smoothly rotated relative to the stationary cam 106, making rotation of the lid 103 smooth, because the friction force is reduced when the projection 107b slides on the inclined surface 106d and engages the concavity 106b. The lid 103 is automatically returned to and held at the closed position ("I" in FIG. 22).

The hinge device eliminates a projection obstructive in design or in use on the lid 103 and the main body 101, contributing greatly to design flexibility, because the lid 103 is held without any lock mechanism. Further, the hinge device facilitates the closing operation because the lid 103 is automatically closed by the torque exerted by the biasing means 108 and the inclined surface 106d of the stationary cam 106. The lid 103, which is rotated within the predetermined range of pivot angle, is held at any variable position because of the friction forces between the friction element 112 and the shaft 105. The friction element 112 which is a plate spring, can be reduced in radial thickness, thus resulting in a compact hinge device which is suitable to a thin, portable device. The friction element 112 of the plate spring is integrally formed with the movable bracket 104, thereby reducing the number of parts. This makes the construction of the hinge device simpler and reduces the manufacturing costs.

The friction element 112 may be a coil spring which is sleeved tightly on the outer surface of shaft 105 instead of the friction element 112 of the plate spring. Although in this preferred form the shaft 105 contact the friction element 112 with the C-shaped cross-section at three points, more than three contact points may be selected in a friction element having other various shapes.

Although the stationary cam is biased toward the movable cam, the movable cam may be biased. Although the concavity is provided in the stationary cam, and the projection is provided on the movable cam, each of them may be provided on either cam. The hinge device can be applied to other portable device such as a cellular telephone.

Preferably, the hinge device of the first embodiment may be provided at the other end in a manner such that the pivot rod is positioned coaxially with the shaft in the third embodiment. The hinge device of the first embodiment changes the friction force effectively in unison with the operation of the hinge device of the third embodiment, thereby providing easy manipulability.

Fourth Embodiment

Referring to FIGS. 28A to 33B, a fourth embodiment of a hinge device according to the present invention, which is adapted for an electronic data-book, will be explained.

Figure 28A:
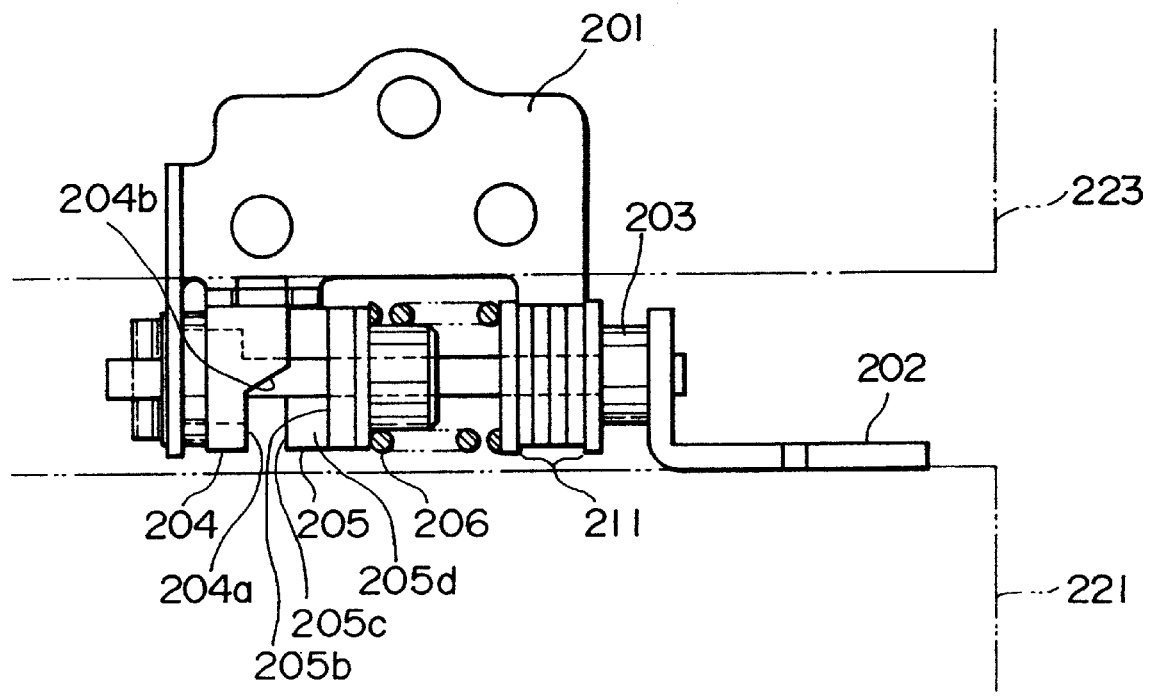
FIG. 28A is a side view of a hinge device of a fourth embodiment according to the present invention.
Figure 28B:
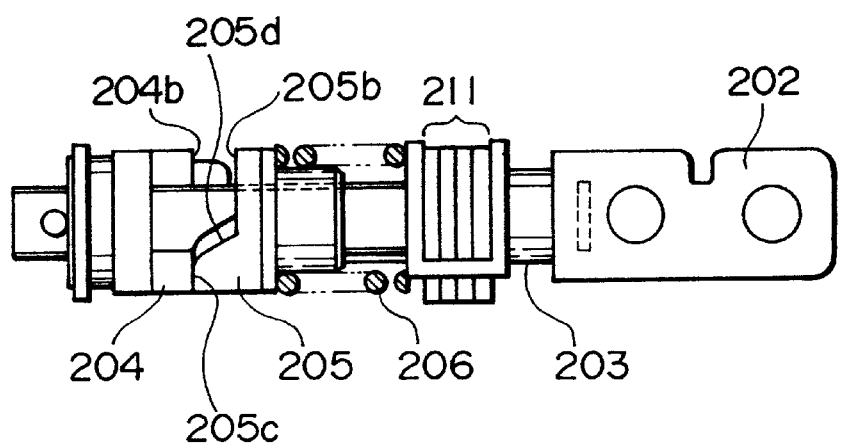
FIG. 28B is a top view of the hinge device of the fourth embodiment.

In FIGS. 28A and 28B, the hinge device is comprised of a stationary bracket 202 fixed to a keyboard 221 (hereinafter, it will be referred to as the "main body") of the electronic data-book, a movable bracket 204 fixed to a liquid crystal display 223 (hereinafter, it will be referred to as the "lid"), a longitudinally extending shaft 203 fixed to the stationary bracket 202, a stationary cam (second cam) 205 receiving the shaft 203 therein in a slidable manner in the direction of the shaft axis, a movable cam (first cam) 204 attached to the movable bracket 204 and receiving the shaft 205 therein in a rotatable manner, a biasing means 206 of a coil spring for biasing the stationary cam 205 toward the movable cam 204 in the direction of the shaft axis, and a plurality of friction plates 211 for exerting a friction force on the shaft 203 being rotated.

The stationary and movable cams 205 and 204 are edge cams which include cam surfaces 205a and 204a abutting against one another and are made of plastic or metal. The stationary cam surface 205a, which is formed upon the edge surface of the cylindrical stationary cam 205, defines a semicircular concavity 205b on one side with respect to the center line, and a friction surface 205c which is flat, perpendicular to the rod axis, and adjacent to the concavity 205b on the other side. A gently inclined surface 205d is disposed between the concavity 205b and the friction surface 205c. The movable cam surface 204a upon the movable cam 204 defines a projection 204b which is adapted to engage the concavity 205b, forming a complement to the stationary cam surface 205a. The movable cam 204 includes a projection 204c attached to the movable bracket 201.

The stationary and movable brackets 202 and 201 are manufactured by bending a thin metal plate through a press. The shaft 203 is attached to the stationary bracket 202 by clamping, for example. The shaft 203 includes two parallel flat stopper portions (rotation stopping means) depressed into its circumference surface, to which the stationary cam 205 is attached, while the stationary cam 205 includes a center hole corresponding to the cross-section of the flat stopper portions. The stationary cam 206 through which the shaft 203 is inserted, is therefore slidable in the direction of the axis while being prevented from being rotated relative to the shaft 203 by the flat stopper portions.

The shaft 203 includes a column-shaped portion with a circular cross-section to which the movable cam 204 is attached. The movable cam 204, which includes a center hole with a circular cross-section for receiving the shaft 203, is therefore rotatable relative to the shaft 203.

Figure 29:
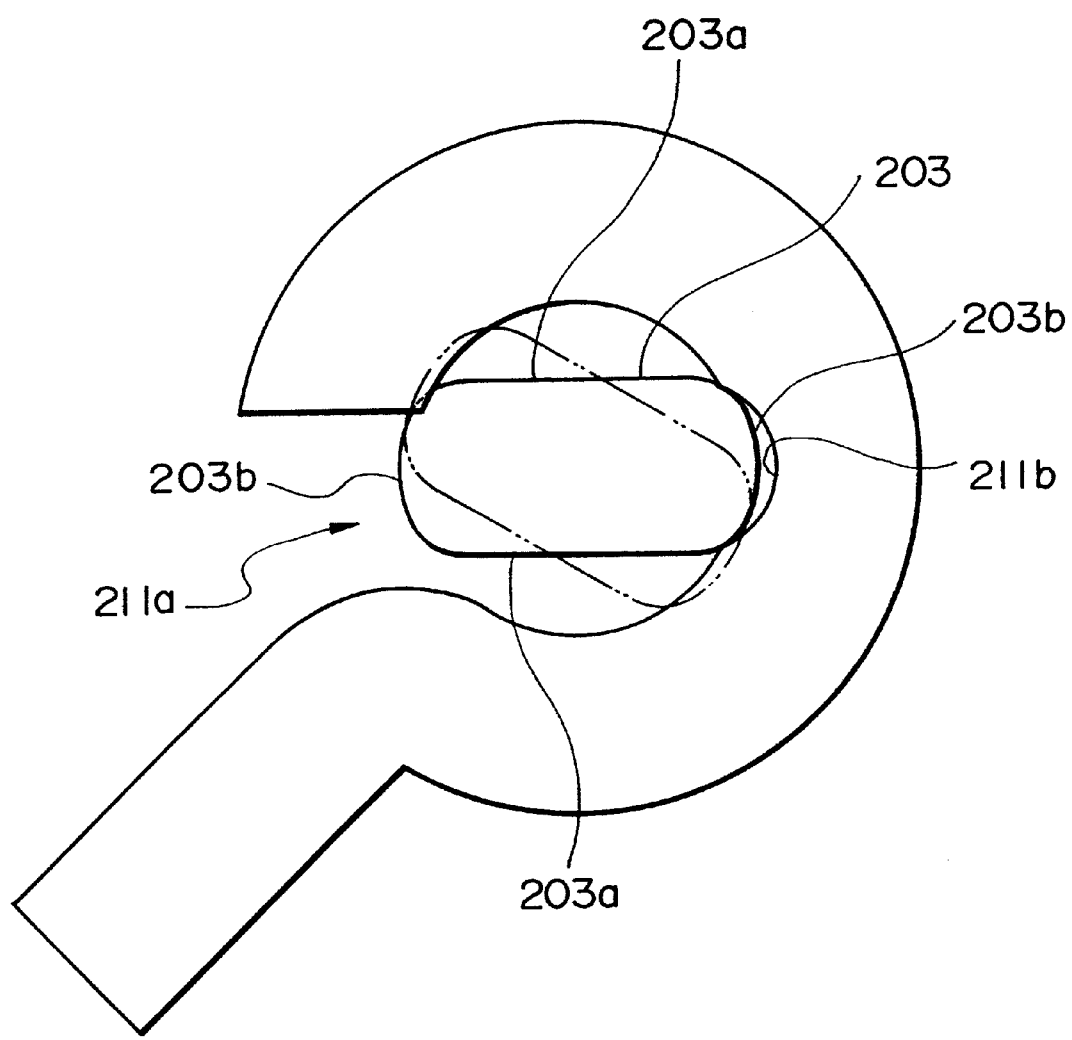
FIG. 29 is a front view of a friction plate of the fourth embodiment when a shaft is inserted into the friction plate.

As shown in FIG. 29, the friction plates 211 have C-shape cross-sections with a gaps (slits) 211a and inside diameters greater than the outside diameter of the shaft 203 when the shaft 203 is not inserted. When the shaft 203 is inserted, the gaps 211a elastically expand so that the interior surfaces of the friction plates 211 contact the circumference of the shaft 203. The friction plates 211 includes recesses 211b on the interior surface opposing the gaps 211a. The friction plates 211 are arranged in layers perpendicularly to the shaft 203.

The shaft 203 includes contact portions 203b for contacting the interior surfaces of the friction plates 211, and non-contact portions 203a depressed into its circumference. These contact portions 203b and non-contact portions 203a are disposed in the holes of the friction plates 211 and symmetrically with respect to the center of rotation.

Figure 30A:
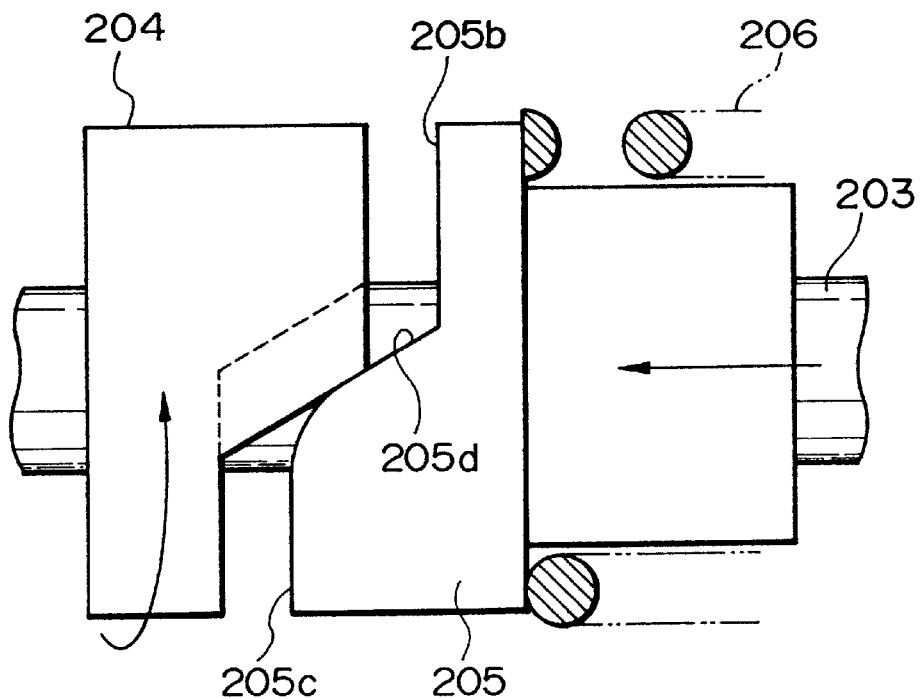
FIG. 30A is a side view of cams of the fourth embodiment.
Figure 30B:
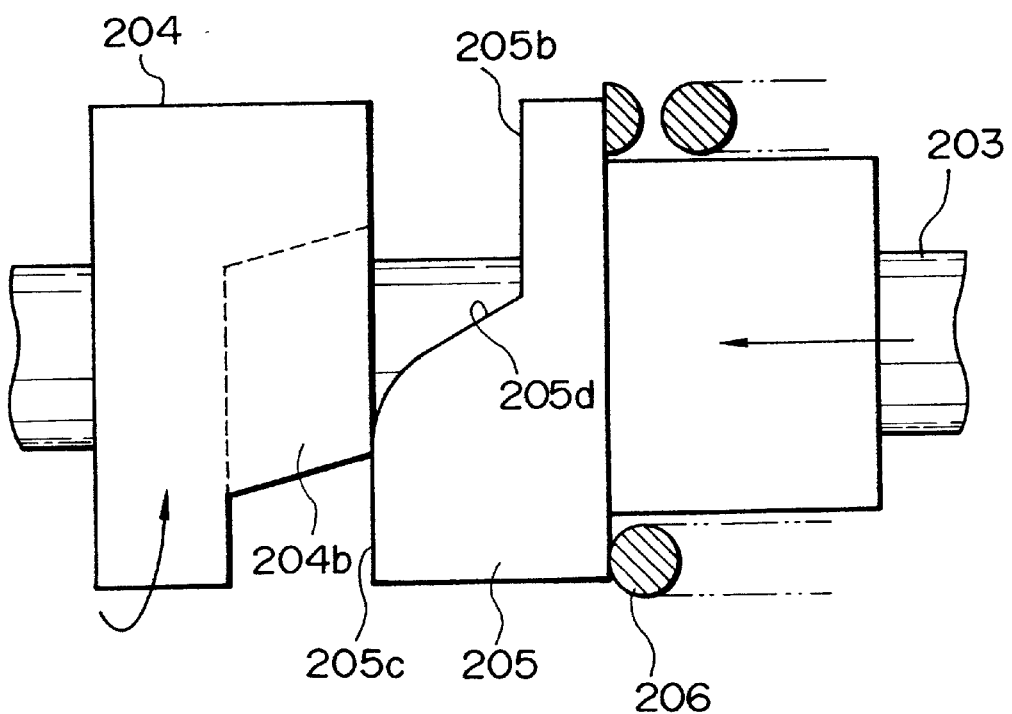
FIG. 30B is a side view of the cams of the fourth embodiment when the movable cam is rotated.

The hinge device is secured to the electronic data-book by way of the stationary bracket 202 fixed to the main body 221 and of the movable bracket 201 fixed to the lid 223 in a manner well-known to those skilled in the art. The relationship between the stationary cam 205 and the movable cam 204 is set in a manner such that the projection 204b of the movable cam 204 is positioned on the middle of the inclined surface 205d of the stationary cam 205 as shown in FIG. 30A, when the lid 223 is closed on the main body 221.

The phase relationship between the movable cam 204 and the stationary cam 205 is set in a manner such that one of the contact portion 203b corresponds the recess 211b and the other contact portion 203b is inserted in the gap 211a when the projection 204b of the movable cam 204 is positioned on the middle of the inclined surface 205d of the stationary cam 205. The friction plates 211, which have been elastically deformed at the other position, are restored, at which point there is no friction force between the shaft 203 and the friction plates 211, which are in a "torque free" state. The biasing force is exerted on the lid as is from the biasing means 206, eliminating a "brake" force by the friction force. Furthermore, the lid 203 is stably held because a considerable initial friction force is required to release the engagement between the contact portion 203b and the recess 211b.

Figure 31:
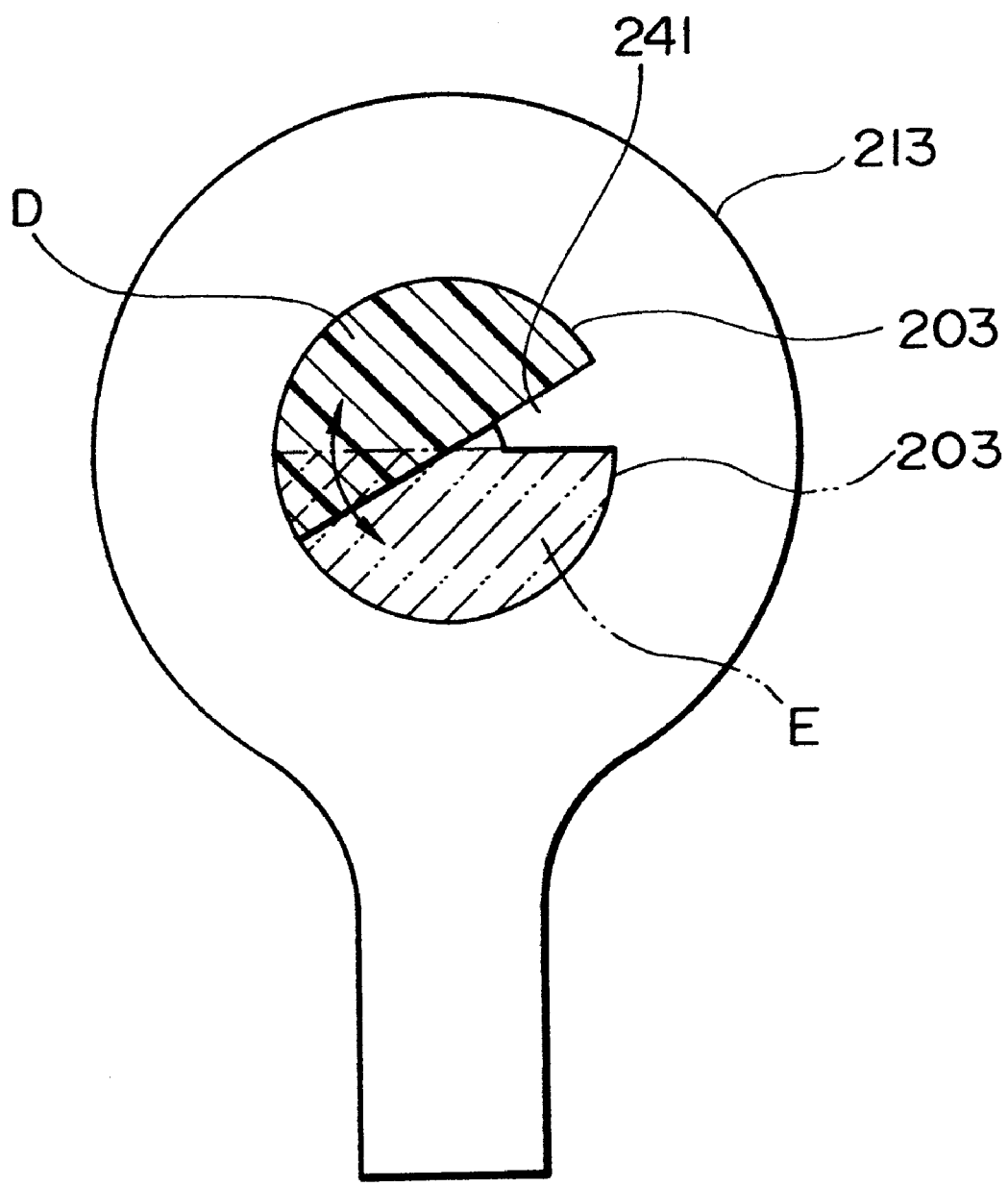
FIG. 31 is a front view of a stopper plate of the fourth embodiment.
Figure 32:
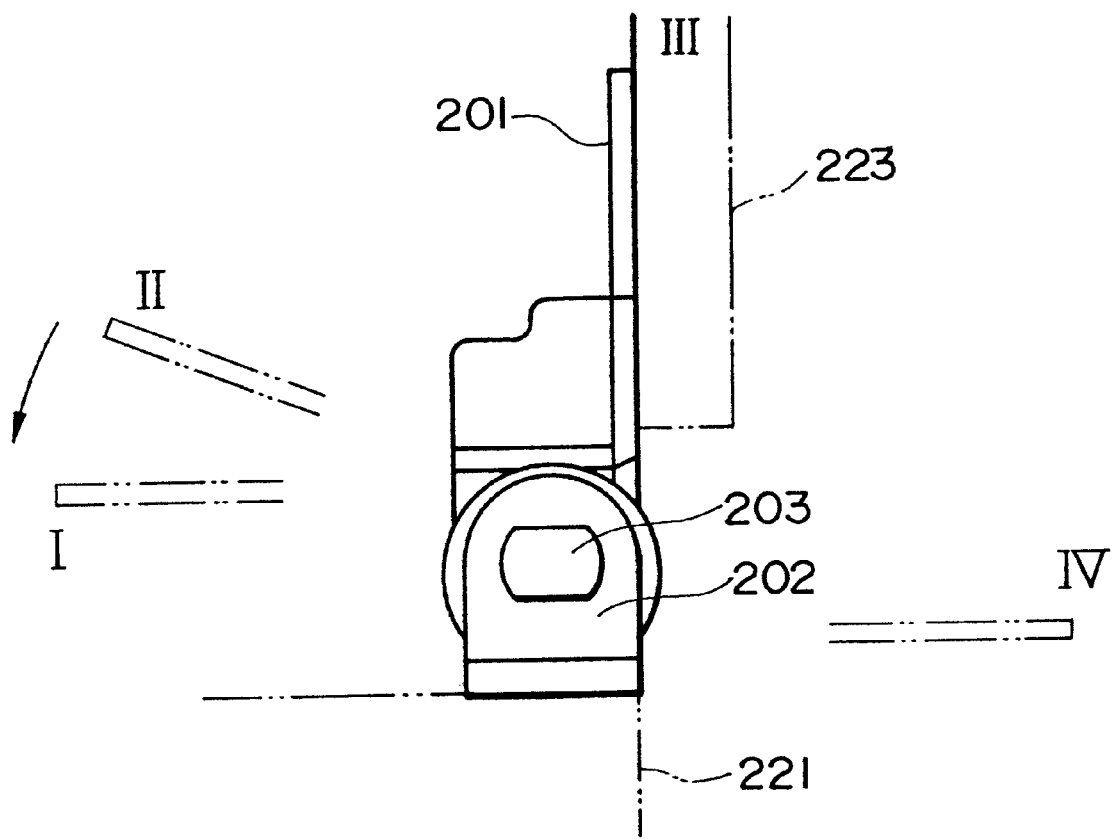
FIG. 32 is a view explaining an operation of the hinge device of the fourth embodiment.

FIG. 31 shows a stopper plate 212 for regulating the rotation range of the shaft 203, which includes a peaked projection 241 formed on the interior surface of a hole in which a shaft 203 is received. The shaft 203 with a semicircular cross-section within the hole, is rotatable between positions D and E because of the regulation by the projection 241. This stopper plate 213 limits the rotation of the shaft 203 within a predetermined range of pivot angle, thus preventing damage to the hinge device because of an excessive force to open the lid 203.

The operation of the hinge device will be explained. The projection 204b of the movable cam 204 is positioned on the middle of the inclined surface 205d of the stationary cam 205 (as shown in FIG. 30A) when the lid 223 is closed relative to the main body 221 of the electronic data-book (at a position "I" in FIG. 32). The biasing means 206 biases the fixed cam 205 toward the stationary cam 204 so that the projection 204b is about to slide down on the inclined faces 205d to engage the concavity 205b, thus providing a rotational torque on the lid 223. The lid 223 is therefore held at the closed position on the main body 221, eliminating a lock mechanism.

The projection 204b of the movable cam 204 goes up on the inclined surface 206d when a force to open the lid 223 is exerted and overcomes the torque by the biasing means 206. The projection 204b is moved from the inclined surface 205d onto the friction surface 205c by rotation of the movable cam 204 for a predetermined range of pivot angle. The lid 223 is held at a closed position (a position "III" in FIG. 32, also shown in FIG. 30B) in the absence of the torque to close the lid 223 until an external force is applied to rotate the lid 203.

The friction plates 211 contacts the circumference of the shaft 205, thus providing a friction force therebetween which prevents rotation of the lid 223 relative to the main body 221. This provides a "free stop" function in which the lid 203 is held at any chosen position (in a range from "II" to "III" in FIG. 32) by the friction force.

The lid 223 can be rotated toward the closed position when a force exerted to the lid 223 overcomes the friction force between the friction plates 211 and the shaft 203. When the projection 204b is entering the inclined surface 205d of the stationary cam 205 (at the position "II" in FIG. 32, also as shown in FIG. 30A), one of the contact portions 203b of the shaft 203 corresponds to the gap 211a and the other contact portion 203b engages the recess 211b, reducing the pressure of the friction plates 211 onto the shaft 205. There is no friction force between the shaft 203 and the friction plates 211, which are in a "torque free" state. The biasing force is exerted on the lid as is from the biasing means 206, eliminating a "brake" force by the friction force.

The movable cam 204 is smoothly rotated relative to the stationary cam 205, making rotation of the lid 223 smooth, because the friction force is reduced when the projection 204b slides on the inclined surface 205d and engages the concavity 205b. The lid 223 is therefore automatically returned in the direction indicated with the arrow in FIG. 30A, and held at the closed position ("I" in FIG. 32).

The number and the thickness of the friction plates 211 are changed in order to adjust the friction force if desired in a particular application. The hinge device thus provides the friction force necessary in a given application.

The hinge device eliminates a projection obstructive in design or in use on the lid 223 and the main body 221, contributing greatly to the design flexibility, because the lid 223 is held without any lock mechanism. Further, the hinge device facilitates the closing operation because the lid 223 is automatically closed by the torque exerted by the biasing means 206 and the inclined surface 205d of the stationary cam 205. The lid 223, which is rotated within the predetermined range of pivot angle, is held at any variable position because of the friction forces between the friction plates 211 and the shaft 205. The friction plates 211 which are plate springs, can be reduced in radial thickness, thus resulting in a compact hinge device which is suitable to a thin, portable device.

Although the stationary cam is biased toward the movable cam, the movable cam may be biased. Although the concavity is provided in the stationary cam, and the projection is provided on the movable cam, each of them may be provided on either cam. The hinge device can be applied to other portable devices such as a cellular telephone.

Preferably, the hinge device of the first embodiment may be provided at the other end in a manner such that the pivot rod is positioned coaxially with the shaft in the fourth embodiment. The hinge device of the first embodiment changes the friction force effectively in unison with the operation of the hinge device of the fourth embodiment, thereby providing easy manipulability.

Fifth Embodiment

Figure 33A:
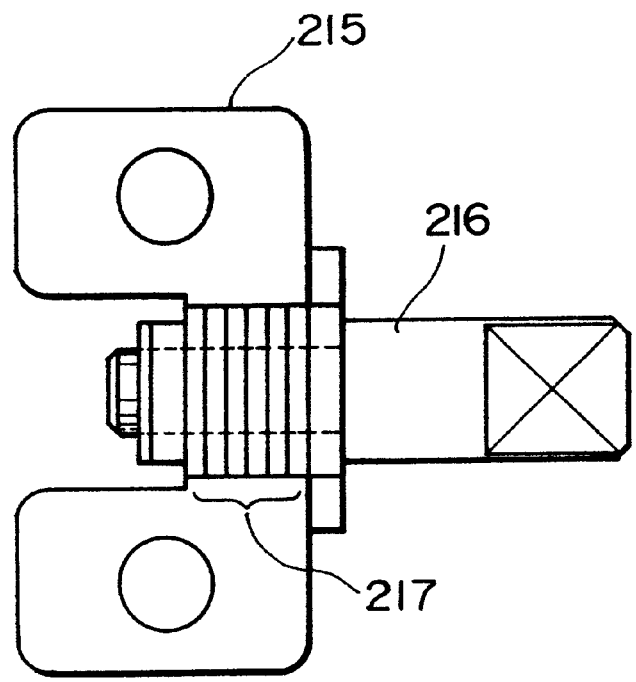
FIG. 33A is a side view of a modification of a hinge device according to the present invention.
Figure 33B:
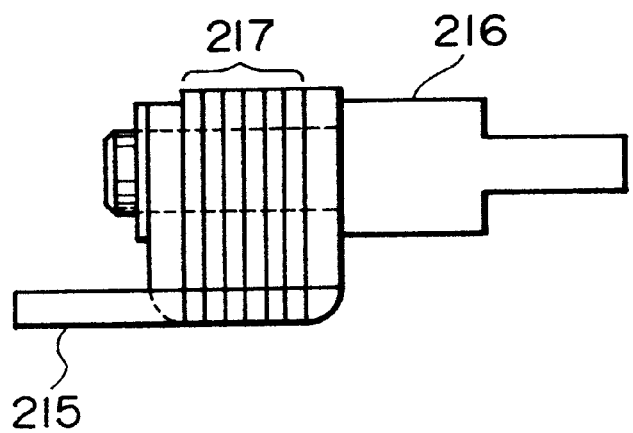
FIG. 33B is a top view of the modification thereof.

Referring to FIGS. 33A and 33B, a fifth embodiment of a hinge device according to the present invention will be explained.

The hinge device is comprised of a stationary bracket 215 attached to a member to be rotated (not shown), a longitudinal-extending movable shaft 216 rotatably supported in the bracket 215, and a plurality of friction plates 217 for exerting a friction force on the shaft 216 when the shaft 216 is being rotated.

The hinge device is principally different from the fourth embodiment in that the hinge device does not include edge cams for holding a lid at rotated positions and a biasing means for biasing the edge cams.

The shaft 216 includes two parallel flat stopper portions (rotation stopping means) depressed into its circumference surface, to which the member to be rotated is attached, while the member includes a center hole corresponding to the cross-section of the flat stopper portions. The member through which the shaft 216 is inserted is therefore rotatable together with the shaft 216 and is prevented from being rotated relative to the shaft 216.

The amount of the torque is determined based on the number and the thickness of the friction plates 217, which are changed in order to adjust the friction force if desired in a particular application. The hinge device thus provides the torque necessary in a given application.

Preferably, the hinge device of the first embodiment may be provided at the other end in a manner such that the pivot rod is positioned coaxially with the shaft in the fourth embodiment. The hinge device of the first embodiment changes the friction force effectively in unison with the operation of the hinge device of the fourth embodiment, thereby providing easy manipulability.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A hinge device for interconnecting a first member with a second member for relative rotational movement, said hinge device comprising:

a first cam being rotatable together with said first member;

a second cam being rotatable together with said second member, said second cam being slidable in a direction of an axis of the rotational movement independently from said second member;

a shaft means coaxially supporting said first cam and said second cam so that they can relatively rotate;

a biasing means for pressing said first cam and second cam to each other, wherein one of said first cam and said second cam has a projection on one end thereof, the other one of said first cam and said second cam having a concavity and a flat portion on one end thereof, said concavity being formed for receiving said projection when said second cam is located in a predetermined range of pivot angle, and said flat portion being formed so as to stably support said projection when said second cam is located in a range other than said predetermined range of pivot angle.

2. A hinge device according to claim 1 wherein said concavity has an inclined surface for guiding said projection.

3. A hinge device according to claim 1, wherein said concavity is radially provided on one end of said second cam.

4. A hinge device according to claim 1 wherein said biasing means is made of a resilient material.

5. A hinge device for interconnecting a first member with a second member for relative rotational movement, said hinge device comprising:

a first cam being rotatable together with said first member;

a second cam being rotatable together with said second member, said second cam being slidable in a direction of an axis of the rotational movement independently from said second member;

a shaft means coaxially supporting said first cam and said second cam so that they can relatively rotate;

a biasing means for pressing said first cam and second cam to each other, and a friction element attached to one of said first and second members, said friction element being in contact with the outer surface of said shaft means in order to exert a friction force on said shaft means, wherein one of said first cam and said second cam has a projection on one end thereof, the other one of said first cam and said second cam having a concavity and a flat portion on one end thereof, said concavity being formed for receiving said projection of said first cam when said second cam is located in a predetermined range of pivot angle, and wherein said friction element comprises at least one cylindrical plate spring sleeved tightly around said shaft means, the interior surfaces of said spring being in contact with the outer surface of said shaft means, the inside diameter of said plate spring, at natural state, is smaller than the outside diameter of said shaft means in order to elastically press said friction plate onto said shaft means.

6. A hinge device according to claim 5, wherein said friction element is made of a metal.

7. A hinge device according to claim 5, wherein said friction element is integrally formed with one of said first and second members.

8. A hinge device according to claim 5, wherein said shaft means has a plurality of contact regions for contacting with said friction element, said friction element having a gap for receiving at least one of said contact regions in order to reduce the friction force on said shaft means when said second cam is in a range other than said predetermined range of pivot angle.

9. A hinge device according to claim 5, wherein said friction element includes a plurality of plate springs, said plate springs being arranged in layers perpendicularly to the shaft means, said plate springs having through holes through which said shaft means is inserted, the interior surfaces of said through holes being in contact with the outer surface of said shaft means.

10. A hinge device according to claim 9, wherein the inside diameters of said through holes of said plate springs, at natural state, are smaller than the outside diameter of said shaft means in order to elastically press said friction plate onto said shaft means.

11. A hinge device according to claim 10, wherein said shaft means has a plurality of contact regions for contacting with said plate springs, said plate springs having a gap for receiving at least one of said contact regions in order to reduce the friction force on said shaft means in a predetermined range of pivot angle.

* * * * *